United States Patent
Yang et al.

(10) Patent No.: US 11,135,515 B2
(45) Date of Patent: Oct. 5, 2021

(54) INFORMATION PROCESSING METHOD AND APPARATUS AND SERVER

(71) Applicant: Tencent Technology (Shenzhen) Company Limited, Shenzhen (CN)

(72) Inventors: Yuejun Yang, Shenzhen (CN); Lin Liu, Shenzhen (CN); Daowei Chong, Shenzhen (CN); Chen Li, Shenzhen (CN); Mianguang Liu, Shenzhen (CN); Chen Peng, Shenzhen (CN); Xuanyao Liu, Shenzhen (CN); Dun Xiao, Shenzhen (CN)

(73) Assignee: TENCENT TECHNOLOGY (SHENZHEN) COMPANY LIMITED, Guangdong Province (CN)

( * ) Notice: Subject to any disclaimer, the term of this patent is extended or adjusted under 35 U.S.C. 154(b) by 244 days.

(21) Appl. No.: 16/425,733

(22) Filed: May 29, 2019

(65) Prior Publication Data

US 2019/0275429 A1    Sep. 12, 2019

Related U.S. Application Data

(63) Continuation of application No. PCT/CN2017/118874, filed on Dec. 27, 2017.

(30) Foreign Application Priority Data

Jan. 5, 2017  (CN) .......................... 201710007956.8
Jan. 23, 2017  (CN) .......................... 201710058471.1

(51) Int. Cl.
*A63F 13/58*  (2014.01)
*A63F 13/31*  (2014.01)
(Continued)

(52) U.S. Cl.
CPC .............. *A63F 13/58* (2014.09); *A63F 13/31* (2014.09); *A63F 13/332* (2014.09);
(Continued)

(58) Field of Classification Search
CPC ........ A63F 13/58; A63F 13/31; A63F 13/332; A63F 2300/53; G06F 9/542; G06F 3/0484
(Continued)

(56) References Cited

U.S. PATENT DOCUMENTS 6,283,861 B1 * 9/2001 Kawai ..................... A63F 13/10
                                                  463/43
8,485,900 B2 * 7/2013 Taoka ..................... A63F 13/10
                                                  463/31
(Continued)

FOREIGN PATENT DOCUMENTS

CN    101136775 A    3/2008
CN    103379163 A    10/2013
(Continued)

OTHER PUBLICATIONS

Tencent Technology, ISRWO, PCT/CN2017/118874, Apr. 3, 2018, 7 pgs.
(Continued)

*Primary Examiner* — Jay Trent Liddle
*Assistant Examiner* — Ryan Hsu
(74) *Attorney, Agent, or Firm* — Morgan, Lewis & Bockius LLP

(57) ABSTRACT

Embodiments of the present disclosure provide an information processing method performed at a mobile terminal. The mobile terminal receives a skill casting request of a first virtual object sent by a first client for requesting to cast a first skill; determines a quantity of virtual objects within a field of view of the first virtual object in a virtual scene; selects
(Continued)

a target virtual object from the field of view of the first virtual object if the quantity of virtual objects is greater than a predetermined threshold, a quantity of target virtual objects corresponding to the predetermined threshold; and determines a first broadcast notification generated in response to the skill casting request, and sends the first broadcast notification to a client of the target virtual object, the first broadcast notification being used for instructing to present an action of casting the first skill by the first virtual object.

20 Claims, 15 Drawing Sheets

(51) Int. Cl.
  *A63F 13/332* (2014.01)
  *G06F 9/54* (2006.01)
  *G06F 3/0484* (2013.01)
(52) U.S. Cl.
  CPC ........... *G06F 3/0484* (2013.01); *G06F 9/542* (2013.01); *A63F 2300/53* (2013.01)
(58) Field of Classification Search
  USPC .......................................................... 463/42
  See application file for complete search history.

(56) References Cited

U.S. PATENT DOCUMENTS

| | | | |
|---|---|---|---|
| 8,997,126 | B2 | 3/2015 | Ishihara |
| 2016/0129345 | A1* | 5/2016 | Seok ..................... A63F 13/426 463/31 |

FOREIGN PATENT DOCUMENTS

| | | |
|---|---|---|
| CN | 103838982 A | 6/2014 |
| CN | 104915117 A | 9/2015 |
| CN | 105194873 A | 12/2015 |
| CN | 105335065 A | 2/2016 |
| CN | 106139593 A | 11/2016 |
| CN | 106657127 A | 5/2017 |
| CN | 106807087 A | 6/2017 |
| JP | 2015523886 A | 8/2015 |
| JP | 2016039859 A | 3/2016 |

OTHER PUBLICATIONS

Tencent Technology, IPRP, PCT/CN2017/118874, Jul. 9, 2019, 5 pgs.

* cited by examiner

INFORMATION PROCESSING METHOD AND APPARATUS AND SERVER

CROSS-REFERENCE TO RELATED APPLICATIONS

This application is a continuation application of PCT/CN2017/118874, entitled "INFORMATION PROCESSING METHOD AND APPARATUS AND SERVER" filed on Dec. 27, 2017, which claims priority to Chinese Patent Application No. 201710007956.8 filed with the Chinese Patent Office on Jan. 5, 2017 and entitled "INFORMATION PROCESSING METHOD AND APPARATUS AND SERVER"; and Chinese Patent Application No. 201710058471.1 filed with the Chinese Patent Office on Jan. 23, 2017 and entitled "METHOD FOR PROCESSING SIMULATED OBJECT IN APPLICATION AND MOBILE TERMINAL", all of which are incorporated by reference in their entireties.

FIELD OF THE TECHNOLOGY

The present disclosure relates to the field of information processing technologies, and specifically, to an information processing method and apparatus and a server.

BACKGROUND OF THE DISCLOSURE

With the rise of games, simulations, and other types of network applications, a plurality of users can participate in activities such as competitions in virtual scenes provided by the network applications through virtual objects created by the users. Generally, one user can control at least one virtual object through one client to perform activities in a virtual scene. For example, in a game network application, a plurality of users can control created game characters through their respective game clients to fight in a game map.

Activities of one virtual object in a virtual scene affect another virtual object in the virtual scene. For example, when a virtual object casts skills, a client of another virtual object in the virtual scene needs to correspondingly present a skill casting action of the virtual object, to manifest reality of the activities of the virtual object in the virtual scene. Therefore, when there is an active virtual object in a virtual scene, a server needs to notify activities of the virtual object to a client of another virtual object in the virtual scene in a timely manner.

However, there may be a large quantity of virtual objects that are simultaneously active in the virtual scene. Therefore, the server needs to deliver a large quantity of notifications to a client, and information downlink pressure is great. In addition, when there are a relatively large quantity of active virtual objects currently, the client need to process a large quantity of delivery notifications to achieve information synchronization. Therefore, information processing pressure of the client is great. In this case, how to reduce an amount of information delivered by the server to the client and reduce the information processing pressure of the client becomes a problem that needs to be considered.

In the existing technology, a hierarchical visual field circle management technology is used in project development of a game engine other than Unity, and in some interactive applications in which a plurality of virtual objects is simultaneously displayed, there are concepts of a server delivery circle and a resource loading circle, for optimizing character rendering pressure and a load/unload speed.

An interactive application in which a plurality of virtual objects is simultaneously displayed is implemented based on a GameBryo engine modified according to a project requirement, and there are only two layers: a server delivery circle and a resource loading circle. After a character enters the server delivery circle, a logic object and a name tag of the character are immediately created. After a player further enters the resource loading circle, a character resource starts to be asynchronously loaded, and a character model instance is immediately created and displayed after the loading is completed.

Such a technical solution can satisfy a multi-player one-screen display efficiency requirement of most personal computer (PC) games. On a PC platform, because performance of both a central processing unit (CPU) and a graphics processing unit (GPU) is far better than that of a mobile end device such as a mobile phone, frame freezing rarely occurs when a resource loading circle is used to implement asynchronous resource loading and character instance creation operations. However, for a mobile device with limited performance and strict requirements on power consumption and heat generation, in a multi-player one-screen type of game, frame freezing frequently occurs and the game cannot run smoothly when a resource loading circle is used to implement asynchronous resource loading and character instance creation operations.

SUMMARY

In view of this, embodiments of the present disclosure provide an information processing method and apparatus and a server, to reduce an amount of information delivered by the server to a client and reduce information processing pressure of the client.

To achieve the foregoing objective, the embodiments of the present disclosure provide the following technical solutions:

An information processing method is performed at a mobile terminal having one or more processors and memory storing a plurality of instructions to be executed by the one or more processors, the method being applied to a first client, in which a plurality of virtual objects is displayed on a screen of the mobile terminal, a first virtual object being displayed on a display interface of the first client, and the method comprising:

receiving a skill casting request of a first virtual object sent by a first client, the skill casting request being used for requesting to cast a first skill;

determining a quantity of virtual objects within a field of view of the first virtual object in a virtual scene;

selecting a target virtual object from the virtual objects within the field of view of the first virtual object if the quantity of virtual objects within the field of view is greater than a predetermined threshold; and obtaining a first broadcast notification generated in response to the skill casting request, and sending the first broadcast notification to a client corresponding to the target virtual object, the first broadcast notification being used for instructing the client to present an action of casting the first skill by the first virtual object.

The embodiments of the present disclosure further provide a mobile terminal comprising one or more processors, memory, and a plurality of machine readable instructions stored in the memory. The plurality of machine readable instructions, when executed by the one or more processors, cause the mobile terminal to perform the aforementioned information processing method as being applied to a first client, in which a plurality of virtual objects is displayed on a screen of the mobile terminal, a first virtual object being displayed on a display interface of the first client.

The embodiments of the present disclosure further provide a non-transitory computer readable storage medium storing a plurality of machine readable instructions in connection with a mobile terminal having one or more processors. The plurality of machine readable instructions, when executed by the one or more processors, cause the mobile terminal to perform the aforementioned information processing method as being applied to a first client, in which a plurality of virtual objects is displayed on a screen of the mobile terminal, a first virtual object being displayed on a display interface of the first client.

BRIEF DESCRIPTION OF THE DRAWINGS

To describe the technical solutions of the embodiments of the present disclosure or the prior art more clearly, the accompanying drawings for illustrating the embodiments or the prior art will be introduced briefly in the following. Apparently, the drawings in the following description are only some embodiments of the present disclosure, and a person of ordinary skill in the art may obtain other drawings based on these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
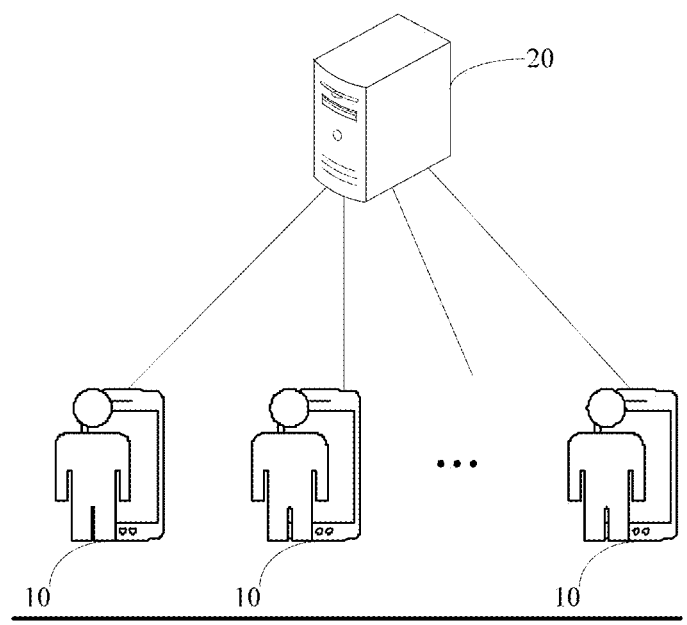
FIG. 1 is a schematic diagram of a system architecture for implementing an information processing method according to an embodiment of the present disclosure.

FIG. 1 is a schematic diagram of a system architecture for implementing an information processing method according to an embodiment of the present disclosure. Referring to FIG. 1, the system architecture may include a plurality of clients 10 and a server 20.

The client 10 may be mounted on a mobile terminal such as a smartphone or a tablet computer, and provide local services for games, simulations, and other types of network applications. Optionally, the client 10 is, for example, a game client.

The server 20 is a service device disposed on a network side to provide network services for games, simulations, and other types of network applications. The server 20 may be a server group including a plurality of servers, or may be implemented by an independent server. Optionally, the server 20 is, for example, a game server.

In this embodiment of the present disclosure, the plurality of clients 10 shown in FIG. 1 may be distributed in different places. The plurality of clients 10 and the server 20 exchange information with each other, load a same virtual scene, and add respectively controlled virtual objects to the virtual scene. Through operations of the clients, the virtual objects controlled by the clients can perform activities in the virtual scene. Optionally, one client 10 can control at least one virtual object (which is generally a virtual object created by a user of the client) to perform an activity in the virtual scene.

Skill casting is a typical activity form of a virtual object. When a client controls a virtual object to cast a skill, the server needs to instruct the client of the virtual object within a field of view of the virtual object to present an action of casting the skill by the virtual object. In this process, how to reduce an amount of information delivered by the server to the client and reduce information processing pressure of the client is a problem that needs to be resolved in the embodiments of the present disclosure.

Figure 2:
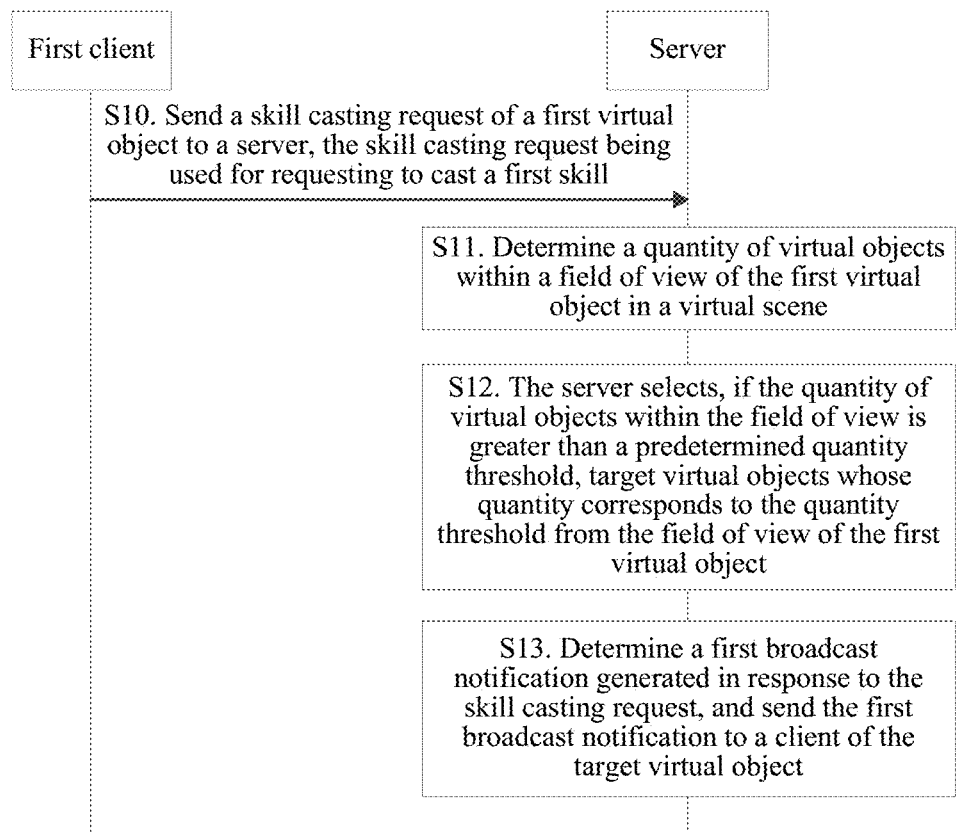
FIG. 2 is a signaling flowchart of an information processing method according to an embodiment of the present disclosure.

To resolve the problem, FIG. 2 is a signaling flowchart of an information processing method according to an embodiment of the present disclosure. The method is applied to a first client, in which a plurality of virtual objects is displayed on a same screen, on a mobile terminal. A first virtual object is displayed on a display interface of the first client. The first client may also be referred to as an interactive application, and the virtual object may also be referred to as a virtual object. With reference to FIG. 1 and FIG. 2, the procedure may include:

Step S10. The first client sends a skill casting request of a first virtual object to a server, the skill casting request being used for requesting to cast a first skill.

The first virtual object is a virtual object controlled by the first client. A visual field of a virtual scene presented by the first client is usually subject to a visual field of the first virtual object in the virtual scene. The first client may be a client corresponding to any virtual object casting a skill in the plurality of clients shown in FIG. 1.

The skill casting request of the first virtual object may be sent by the first client to the server when an operation of a user of the first client triggers the first virtual object to cast the first skill. For example, the user of the first client may click a cast icon for the first skill on the screen, to trigger the first virtual object to cast the first skill, or the user of the first client may use an input device such as an external keyboard or mouse, to trigger the first virtual object to cast the first skill, so that the first client sends the skill casting request of the first virtual object to the server.

Correspondingly, the server may receive the skill casting request of the first virtual object sent by the first client.

Step S11. The server determines a quantity of virtual objects within a field of view of the first virtual object in a virtual scene.

The determining a quantity of virtual objects within a field of view of the first virtual object in a virtual scene is determining how many virtual objects there are within the field of view of the first virtual object.

Optionally, the quantity of virtual objects within the field of view of the first virtual object may be determined by matching coordinates of the virtual objects in the virtual scene with a coordinate range corresponding to the field of view of the first virtual object. In this embodiment of the present disclosure, coordinates of the first virtual object in the virtual scene may be determined, the coordinates of the first virtual object are used as a center, and a set coordinate range (generally a virtual scene coordinate range that can be displayed on a single screen) including the coordinates of the first virtual object is used as the field of view of the first virtual object. Correspondingly, a corresponding coordinate range of the field of view of the first virtual object in the virtual scene can be obtained. Then coordinates of the virtual objects in the virtual scene are matched with the coordinate range, to determine a quantity of virtual objects whose coordinates fall within the coordinate range, to obtain the quantity of virtual objects.

Figure 3:
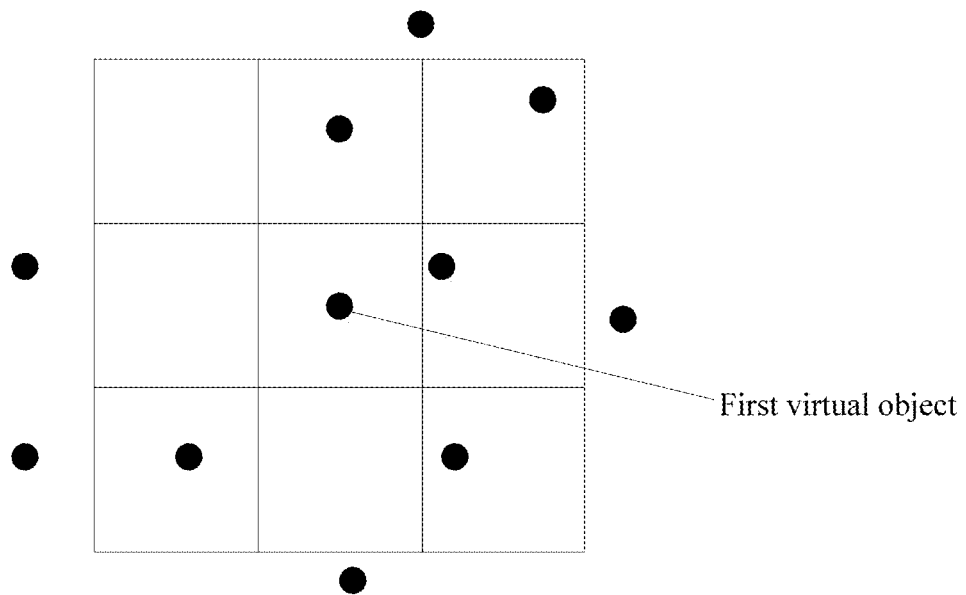
FIG. 3 is a schematic diagram of determining a virtual object within a field of view of a first virtual object.

Optionally, the coordinate range corresponding to the field of view of the first virtual object may be a set range using the coordinates of the first virtual object as a center. As shown in FIG. 3, in this embodiment of the present disclosure, the coordinates of the first virtual object may be used as a center, to construct a nine-square range with a set size, to determine the coordinate range corresponding to the field of view of the first virtual object. In this way, a virtual object whose coordinates in the virtual scene fall within the nine-square range is determined as a virtual object within the field of view of the first virtual object (for example, a virtual object falling within the nine-square range in FIG. 3, where the virtual object is represented by a black spot in FIG. 3), and the quantity of virtual objects within the field of view of the first virtual object is obtained.

Step S12. The server selects a target virtual object from the virtual objects within the field of view of the first virtual object if the quantity of virtual objects within the field of view is greater than a predetermined threshold.

Optionally, in this embodiment of the present disclosure, a threshold may be predetermined, and whether the quantity of virtual objects within the field of view is greater than the predetermined threshold is determined after the quantity of virtual objects within the field of view is determined.

If the quantity of virtual objects within the field of view is greater than the predetermined threshold, it may be determined that there are a relatively large quantity of virtual objects within the field of view of the first virtual object. If clients of all the virtual objects within the field of view of the first virtual object are instruct to present the action of casting the first skill by the first virtual object, an amount of information delivered by the server to the clients is large. If there are currently a relatively large quantity of virtual objects simultaneously casting skills, an amount of information received by a client and delivered by the server is relatively large, and information processing pressure of the client is increased. Based on this, in this embodiment of the present disclosure, when the quantity of virtual objects within the field of view of the first virtual object is greater than the predetermined threshold, only target virtual objects whose quantity corresponds to the predetermined threshold may be selected from the field of view of the first virtual object, and subsequently, only clients of the target virtual objects are instructed to present the action of casting the first skill by the first virtual object.

Optionally, the predetermined threshold may be a value defined according to a plurality of actual test results. The predetermined threshold can ensure that the server delivers a relatively small amount of information, and there are still a relatively large quantity of virtual objects currently casting skills and presented in the client, so that a presentation effect of a skill casting action is not much degraded, and activity reality of the virtual object in the virtual scene can still be manifested (for example, an effect of maintaining fierceness of a game fight scene). In this embodiment of the present disclosure, the predetermined threshold is not limited to a specific value, and can be set according to a specific network application type or an actual network application status after a test is performed.

Step S13. The server obtains a first broadcast notification generated in response to the skill casting request, and sends the first broadcast notification to a client corresponding to the target virtual object, the first broadcast notification being used for instructing the client to present an action of casting the first skill by the first virtual object.

Optionally, the first broadcast notification may be generated in response to the skill casting request when the server receives the skill casting request or after a client that is of a virtual object and to which the first broadcast notification needs to be delivered is determined.

Optionally, the first broadcast notification may be a broadcast notification triggering presentation of the action of casting the first skill by the first virtual object, and the action of casting the first skill by the first virtual object is a skill casting action that needs to be performed when the first virtual object casts the first skill. After performing the skill casting action, the first virtual object can cast the first skill.

In this embodiment of the present disclosure, when the server receives the skill casting request that is sent by the first client for requesting the first virtual object to cast the first skill, the server may determine the quantity of virtual objects within the field of view of the first virtual object in the virtual scene, select, when the quantity of virtual objects within the field of view is greater than the predetermined threshold, target virtual objects whose quantity corresponds to the predetermined threshold from the field of view of the first virtual object, determine the first broadcast notification generated in response to the skill casting request, and send the first broadcast notification to the client of the target virtual object, so that the client of the target virtual object presents the action of casting the first skill by the first virtual object, and when the first virtual object of the first client casts the first skill, the client of the virtual object within the field of view of the first virtual object performs a corresponding presentation for the action of casting the first skill by the first virtual object, thereby maintaining activity reality of the virtual object in the virtual scene.

The server can send, according to the predetermined threshold, the first broadcast notification to clients whose quantity is less than the quantity of virtual objects when the first virtual object casts a skill and the quantity of virtual objects within the field of view of the first virtual object is greater than the predetermined threshold. Therefore, an amount of information delivered by the server to a client is reduced. In addition, when there are currently a relatively large quantity of virtual objects that simultaneously cast skills, an amount of information obtained by the client can be reduced, thereby reducing information processing pressure of the client.

Optionally, if the quantity of virtual objects within the field of view of the first virtual object determined in step S11 is less than or equal to the predetermined threshold, it may be determined that there is a relatively small quantity of virtual objects within the field of view of the first virtual object. Even if the server instructs the clients of all the virtual objects within the field of view of the first virtual object to present the action of casting the first skill by the first virtual object, an amount of information to be delivered by the server can be controlled to fall within a small quantity range. Therefore, the server can send a second broadcast notification to the clients of all the virtual objects within the field of view of the first virtual object when the quantity of virtual objects within the field of view is less than or equal to the predetermined threshold, to instruct the clients of all the virtual objects within the field of view of the first virtual object to present the action of casting the first skill by the first virtual object.

Optionally, the server may determine, according to whether the first skill to be cast by the first virtual object adjusts a location of the first virtual object in the virtual scene (for example, whether the first skill is a displacement skill), whether to use the method shown in FIG. 2 to perform information processing.

Figure 4:
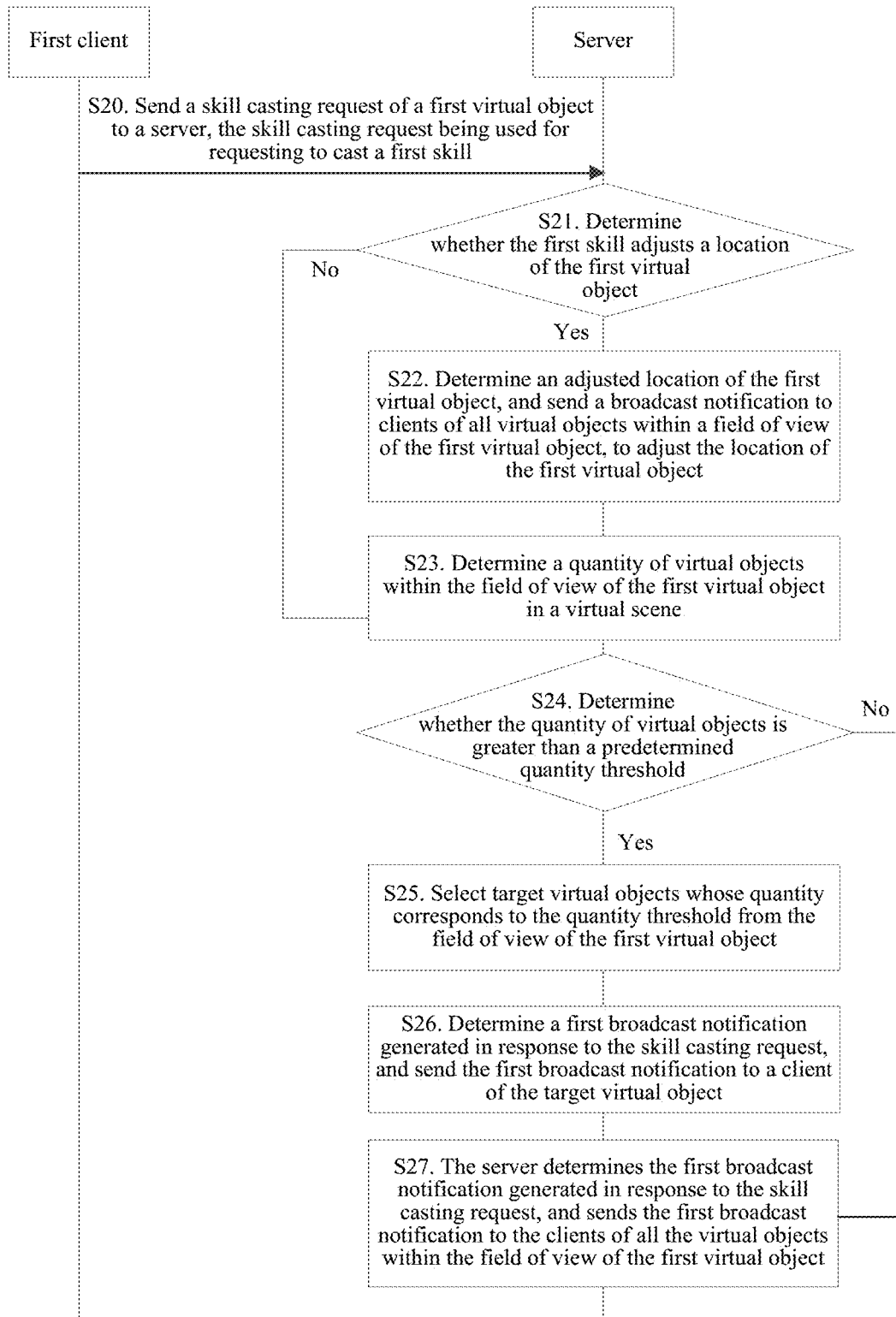
FIG. 4 is another signaling flowchart of an information processing method according to an embodiment of the present disclosure.

Optionally, FIG. 4 shows another signaling procedure of an information processing method according to an embodiment of the present disclosure. With reference to FIG. 1 and FIG. 4, the procedure may include:

Step S20. A first client sends a skill casting request of a first virtual object to a server, the skill casting request being used for requesting to cast a first skill.

Step S21. The server determines whether the first skill adjusts a location of the first virtual object in a virtual scene, and if yes, performs step S22, or if no, performs step S23.

Optionally, the server may pre-record a skill identifier, and a skill corresponding to the pre-recorded skill identifier can adjust the location of the first virtual object in the virtual scene. Therefore, after receiving the skill casting request, the server can match a skill identifier of the first skill requested by the skill casting request with the pre-recorded skill identifier. If the skill identifier of the first skill matches the pre-recorded skill identifier, it may be determined that the first skill can adjust the location of the first virtual object in the virtual scene. If the skill identifier of the first skill does not match the pre-recorded skill identifier, it may be determined that the first skill cannot adjust the location of the first virtual object in the virtual scene.

If the first skill is used for adjusting the location of the first virtual object in the virtual scene, because a location change of the first virtual object needs to be notified to other virtual objects within a field of view of the first virtual object in a timely manner before a newest location of the first virtual object is synchronized between other clients, in this embodiment of the present disclosure, clients of all virtual objects within the field of view of the first virtual object need to be instructed to adjust the location of the first virtual object, to ensure synchronization of a new location of the first virtual object between other clients.

If the first skill is not used for adjusting the location of the first virtual object in the virtual scene, if clients of all virtual objects within a field of view of the first virtual object do not update a location requirement of the first virtual object in a timely manner, in this embodiment of the present disclosure, a range of clients to which an action of casting the first skill by the first virtual object is to be notified may be determined based on a result of comparison between a quantity of virtual objects within the field of view of the first virtual object and a predetermined threshold.

Step S22. The server determines an adjusted new location of the first virtual object in the virtual scene, and sends a third broadcast notification to clients of all virtual objects within a field of view of the first virtual object, the third broadcast notification being used for instructing to update the location of the first virtual object in the virtual scene to the new location.

Step S23. The server determines a quantity of virtual objects within the field of view of the first virtual object in the virtual scene.

Step S24. The server determines whether the quantity of virtual objects within the field of view is greater than a predetermined threshold, and if yes, performs step S25, or if no, performs step S27.

Step S25. The server selects target virtual objects whose quantity corresponds to the predetermined threshold from the field of view of the first virtual object.

Step S26. The server determines the third broadcast notification generated in response to the skill casting request, and sends a first broadcast notification to a client of the target virtual object.

Step S27. The server determines the third broadcast notification generated in response to the skill casting request, and sends the third broadcast notification to the clients of all the virtual objects within the field of view of the first virtual object.

As can be learned, in this embodiment of the present disclosure, step S11 shown in FIG. 2 may be performed when the first skill cast by the first virtual object does not adjust the location of the first virtual object in the virtual scene. When the first skill cast by the first virtual object adjusts the location of the first virtual object in the virtual scene, the third broadcast notification for adjusting the location of the first virtual object in the virtual scene to the new location is sent to the clients of all the virtual objects within the field of view of the first virtual object. When the first skill cast by the first virtual object does not adjust the location of the first virtual object in the virtual scene, but the quantity of virtual objects within the field of view of the first virtual object is not greater than the predetermined threshold, the first broadcast notification is sent to the clients of all the virtual objects within the field of view of the first virtual object.

Optionally, manners in which the server selects target virtual objects whose quantity corresponds to the predetermined threshold from the field of view of the first virtual object include, but are not limited to, the following manners:

First manner: In this embodiment of the present disclosure, target virtual objects whose quantity corresponds to the predetermined threshold may be randomly selected from the field of view of the first virtual object. For example, target virtual objects whose quantity is equal to the predetermined threshold are selected.

Second manner: Virtual objects within the field of view of the first virtual object may belong to different groups, and the virtual objects of the groups may be in a hostile relationship. To balance presentation of the action of casting the first skill by the first virtual object in different groups, in this embodiment of the present disclosure, various types of groups to which all the virtual objects within the field of view of the first virtual object belong may be determined, and then target virtual objects whose quantity corresponds to the predetermined threshold are selected from the field of view of the first virtual object, a corresponding quantity of target virtual objects in each type of group meeting a set requirement. That a corresponding quantity of target virtual objects in each type of group meets a set requirement is, for example, that corresponding quantities of target virtual objects in all the types of groups are equal. That a corresponding quantity of target virtual objects in each type of group meeting a set requirement is, for another example, that if the first skill is a skill targeted by the first virtual object at virtual objects of a first group, a proportion of virtual objects of the first group in the target virtual objects may be increased and a proportion of virtual objects of non-first groups in the target virtual objects may be reduced.

Third manner: In this embodiment of the present disclosure, target virtual objects whose quantity corresponds to the predetermined threshold may alternatively be selected according to relationship degrees between the virtual objects within the field of view of the first virtual object. For example, target virtual objects whose quantity is equal to the predetermined threshold are selected. For example, target virtual objects whose relationship degrees with the first virtual object rank high and whose quantity corresponds to the predetermined threshold are preferentially selected from the field of view of the first virtual object (that a relationship degree ranks high may be that the relationship degree ranks high in descending sorting, or that the relationship degree ranks high in ascending sorting; that the relationship degree ranks high in descending sorting is generally considered that a virtual object ranking higher is closer to the first virtual object, and that the relationship degree ranks high in ascending sorting is generally considered that a virtual object ranking higher is more hostile to the first virtual object).

Optionally, after receiving the skill casting request of the first virtual object sent by the first client, the server may first process skill casting consumption of the first virtual object. For example, to cast the first skill, the first virtual object needs to consume magic points, hit points, rage points, or the like, and the server may first broadcast magic points, hit points, or rage points that need to be consumed by the first virtual object for casting the first skill.

For example, in a game network application, correspondingly, the client may be a game client, the server may be a game server, and the virtual object may be a game character controlled by a user by using the game client. Currently, fights between different groups in the game relate to fights between numerous game characters of different groups in a same game map. The fights between the game characters are very fierce, and skills are quite frequently cast. If information about skill casting by each game character is broadcast to game clients of other game characters within a field of view of the game character when the game character casts a skill, a huge amount of information is delivered by the game server, and the game clients are under great information amount pressure.

Figure 5:
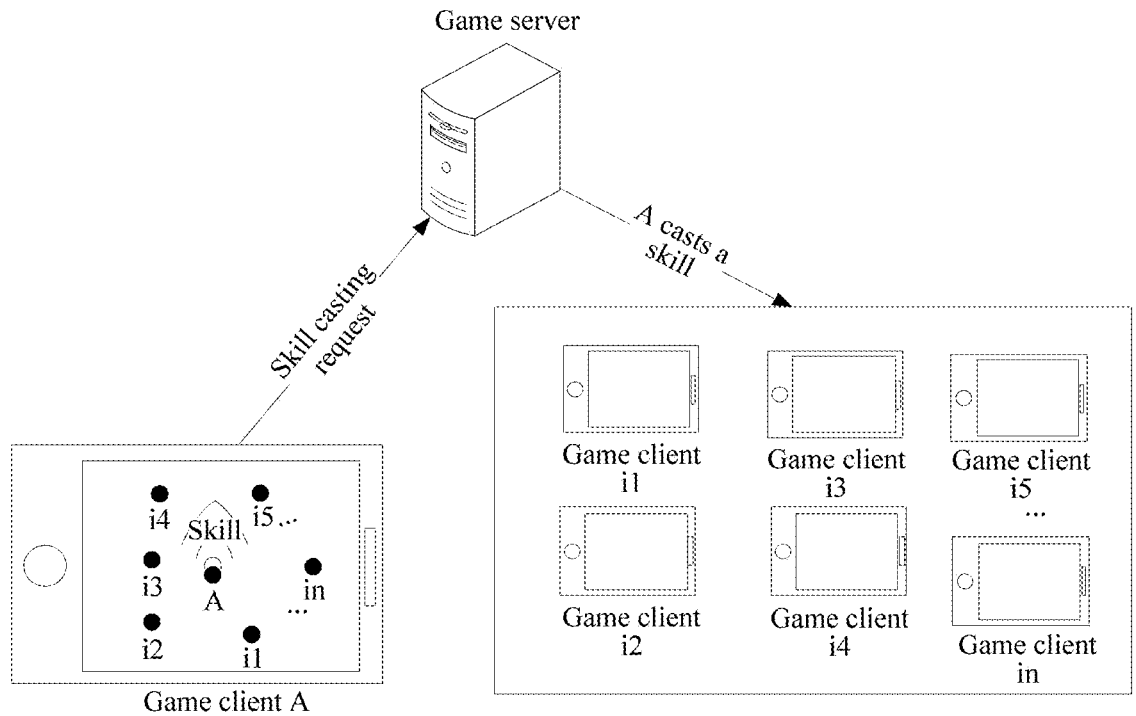
FIG. 5 is a schematic diagram showing that a game server instructs a game client to present an action of casting a skill by a game character.

As shown in FIG. 5, when a game character A casts a skill, a game client of the game character A is controlled to send a skill casting request of the game character A to the game server, and the server broadcasts information about skill casting by the game character A to game clients of other game characters (i1 to in) within a field of view of the game character A, so that the game clients of other game characters within the field of view of the game character A present an action of skill casting by the game character A. FIG. 5 shows an information delivery status of the server when one game character casts a skill. However, in a group fighting, there are numerous game characters simultaneously casting skills in one game map. This undoubtedly increases the amount of information delivered by the server and increases information processing pressure of the game clients.

Therefore, in this embodiment of the present disclosure, when the game character A casts a skill and the game server receives the skill casting request of the game character A, the game server may determine a quantity of game characters within the field of view of the game character A. When the game server determines that the quantity of the game characters is greater than a predetermined threshold, the game server may select game characters whose quantity corresponds to the predetermined threshold from the field of view of the game character A, and broadcast information about skill casting by the game character A to game clients of the selected game characters, so that the game clients of the selected virtual characters present an action of skill casting by the game character A. Setting an appropriate predetermined threshold can enable game clients of only game characters whose quantity corresponds to the predetermined threshold to present the action of skill casting by the game character A when there are a relatively large quantity of game characters within the field of view, thereby reducing an information downlink amount of the game server while maintaining fierceness of the game fighting and activity reality of the game characters, and reducing information processing pressure of the game clients.

Figure 6:
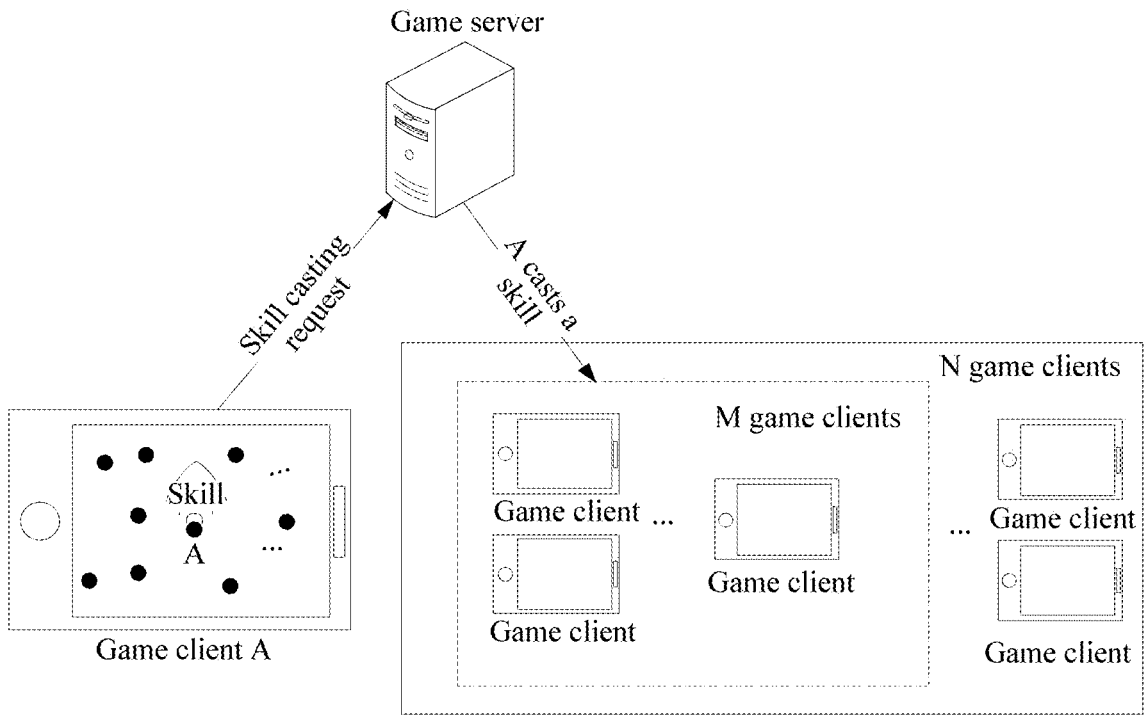
FIG. 6 is another schematic diagram showing that a game server instructs a game client to present an action of casting a skill by a game character.

As shown in FIG. 6, the predetermined threshold is set to M, and M=20. When the game server determines that the quantity of the game characters within the field of view of the game character A is N, and N>M, the game server may not broadcast the information about skill casting by the game character A to game clients of the N game characters, but select only M game characters whose quantity is smaller from the N game characters, and broadcast the information about skill casting by the game character A to game clients of the N game characters. In this way, a quantity of broadcast notifications to be delivered by the game server is reduced from a larger N to a smaller M, thereby reducing an amount of information delivered by the game server.

Optionally, if the quantity of the game characters within the field of view of the game character A is less than or equal to the predetermined threshold, the information about skill casting by the game character A may be broadcast to game clients of all the game characters within the field of view of the game character A.

Further, if the first skill cast by the first virtual object targets at at least one second virtual object (where the second virtual object may be a virtual object in the virtual scene other than the first virtual object), and a skill effect of the first skill influences an attribute value of the at least one second virtual object (for example, has a buff influence or a debuff influence on the attribute value), in this embodiment of the present disclosure, the server may broadcast to the clients depending on different situations, to present information about the skill effect of the influence of the first skill on the second virtual object. Optionally, the first skill cast by the first virtual object herein influences the attribute value of the second virtual object in the virtual scene.

Figure 7:
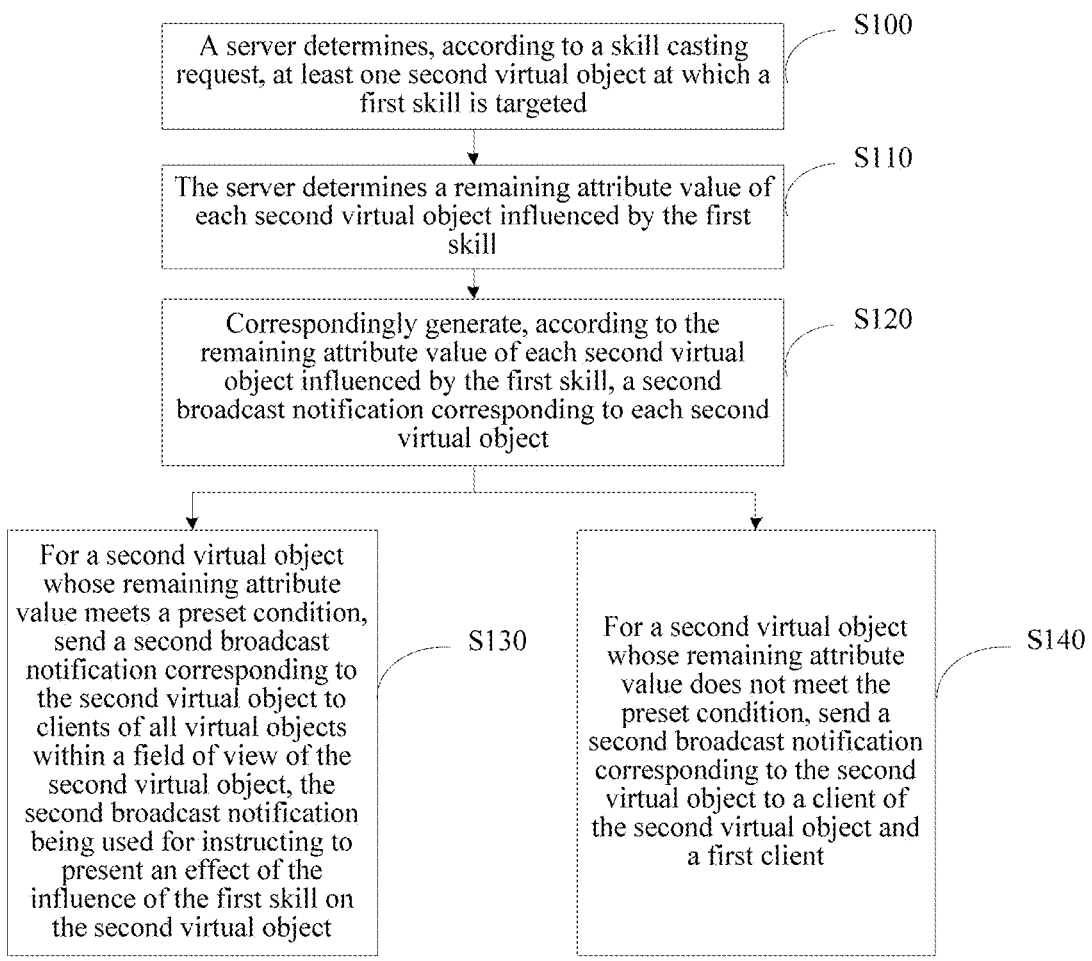
FIG. 7 is a flowchart of a method in which a server instructs a client to present a skill effect.

Optionally, from the perspective of the server, FIG. 7 is a flowchart of a method in which a server instructs a client to present a skill effect. The method may be applied to the server. Referring to FIG. 7, the method may include:

Step S100. The server determines, according to the skill casting request, at least one second virtual object at which the first skill is targeted.

Optionally, if the first skill has a targeted to-be-cast object, in addition to carrying a skill identifier of the first skill, the skill casting request may further carry a virtual object list at which the first skill is targeted, and the virtual object list may record the at least one second virtual object at which the first skill cast by the first virtual object is targeted.

The second virtual object at which the first skill is targeted may be indicated by a user of the first client, and recorded in the virtual object list.

Step S110. The server determines a remaining attribute value of each second virtual object influenced by the first skill.

Optionally, the remaining attribute value may be remaining hit points, remaining magic points, remaining rage points, or the like of the second virtual object. A specific form of the remaining attribute value may be set according to an actual situation.

For example, the remaining attribute value is remaining hit points of the second virtual object. After determining each second virtual object at which the first skill is targeted, for each second virtual object, the server may invoke defense power of the second virtual object and attack power of the first virtual object, calculate damage points of each second virtual object attacked by the first skill, and subtract the damage points from current hit points of the second virtual object, to obtain remaining hit points of the second virtual object. Obviously, only an optional method for calculating the damage points of the second virtual object attacked by the first skill is described in this paragraph. Further, the damage points of the second virtual object attacked by the first skill may further be determined with reference to a damage base and a damage type of the first skill, damage resistance of the second virtual object, and the like. The calculation in the optional method and calculation in cases in which the remaining attribute value is the remaining magic points, the remaining rage points, or the like of the second virtual object are similar to each other, and may refer to each other.

Step S120. Correspondingly generate, according to the remaining attribute value of each second virtual object influenced by the first skill, a broadcast notification for instructing to present an effect of the influence of the first skill on the second virtual object.

Because different second virtual objects have different damage resistance, and remaining attribute values of the different second virtual objects influenced by the first skill are different, broadcast notifications corresponding to the second virtual objects need to be respectively generated for the remaining attribute values of the second virtual objects influenced by the first skill.

Step S130. For a second virtual object whose remaining attribute value meets a preset condition, send a second broadcast notification corresponding to the second virtual object to clients of all virtual objects within a field of view of the second virtual object, the second broadcast notification being used for instructing to present an effect of the influence of the first skill on the second virtual object.

Optionally, the first skill may be a debuff skill targeted at the second virtual object. For example, the remaining attribute value is remaining hit points. In this embodiment of the present disclosure, the preset condition in which the second broadcast notification is sent to all the virtual objects within the field of view of the second virtual object may be set. For example, the preset condition is: the remaining hit points of the second virtual object influenced by the first skill are less than set hit points, or the remaining hit points are zero (that is, after being attacked by the first skill, the second virtual object is dead), or the like.

Optionally, the first skill may alternatively be a buff skill targeted at the second virtual object. For example, the remaining attribute value is remaining hit points. The preset condition may alternatively be: the remaining hit points of the second virtual object influenced by the first skill are completed recovered (for example, the remaining hit points are maximum hit points).

Optionally, a preset condition when the remaining attribute value is remaining magic points, remaining rage points, or the like of the second virtual object may be set with reference to the case in which the remaining attribute value is the remaining hit points. In this embodiment of the present disclosure, the preset condition may be set to a specific form according to an actual situation, instead of in a fixed manner.

After a remaining attribute value of a second virtual object is calculated, if the remaining attribute value of the second virtual object meets the preset condition, the server may send the second broadcast notification to clients of all virtual objects within a field of view of the second virtual object, so that the clients of all the virtual objects within the field of view of the second virtual object present an effect of the influence of the first skill on the second virtual object. For example, when it is determined that a second virtual object is dead after being attacked by the first skill, information about an effect of the influence of the first skill on the second virtual object may be broadcast to clients of all virtual objects within a field of view of the second virtual object, so that the clients of all the virtual objects within the field of view of the second virtual object can learn of the information about the death of the second virtual object.

Step S140. For a second virtual object whose remaining attribute value does not meet the preset condition, send a second broadcast notification corresponding to the second virtual object to a client of the second virtual object and the first client.

Optionally, after a remaining attribute value of a second virtual object is calculated, if the remaining attribute value of the second virtual object does not meet the preset condition preset condition (for example, the remaining hit points of the second virtual object are not zero, and the second virtual object is still alive, or the remaining hit points of the second virtual object are not less than set hit points), it is not necessary to send the second broadcast notification to clients of all virtual objects within a field of view of the second virtual object. To reduce an amount of information delivered by the server, the server may send the second broadcast notification only to a client of the second virtual object and the first client, so that the client of the second virtual object and the first client present an effect of the influence of the first skill on the second virtual object.

Optionally, when the client presents the effect of the influence of the first skill on the second virtual object, the client may present an attribute adjustment value of the second virtual object influenced by the first skill, and a remaining attribute value obtained by combining a current attribute value with the attribute adjustment value. Correspondingly, the second broadcast notification may carry the attribute adjustment value and the remaining attribute value of the second virtual object. For example, the attribute value is hit points, and the first skill is an attack skill. The second broadcast notification may carry lost hit points (that is, damage points) and remaining hit points of the second virtual object attacked by the first skill.

It should be noted herein that, if the remaining hit points are zero, a death event of the second virtual object is triggered, death logic of a corresponding virtual object (generally, a virtual object falls to the ground when the virtual object becomes dead) needs to be executed, and respawning logic of the virtual object may further be enabled.

Correspondingly, the client may directly present, according to the attribute adjustment value and the remaining attribute value of the second virtual object that are carried in the second broadcast notification, the attribute adjustment value and the remaining attribute value of the second virtual object influenced by the first skill. For example, the client may directly present lost hit points and remaining hit points of the second virtual object, without incrementally updating the attribute value of the second virtual object on the client.

Optionally, if the first skill can adjust the location of the first virtual object in the virtual scene, because a location change of the first virtual object needs to be notified to other virtual objects within a visual field of the first virtual object in a timely manner, in this embodiment of the present disclosure, the server needs to send a third broadcast notification to the clients of all the virtual objects within the field of view of the second virtual object, the third broadcast notification being used for instructing to present an adjusted location of the first virtual object in the virtual scene. The adjusted location of the first virtual object in the virtual scene may be determined by the server according to a location difference between a location of the first virtual object when the first virtual object casts the first skill and an adjusted location corresponding to the first skill.

For example, for a game network application, in this embodiment of the present disclosure, the preset condition may be set to: remaining hit points of a game character influenced by the first skill are zero (that is, the game character influenced by the first skill is dead). Fights between different groups in the game relate to fights between numerous game characters of different groups in a same game map. The fights between the game characters are very fierce, and skills are quite frequently cast. If an effect of an influence of a skill on each game character is broadcast to game clients of other game characters within a field of view of the game character when the game character is influenced by the skill, a huge amount of information is delivered by a game server, and the game clients are under great information processing pressure.

Figure 8:
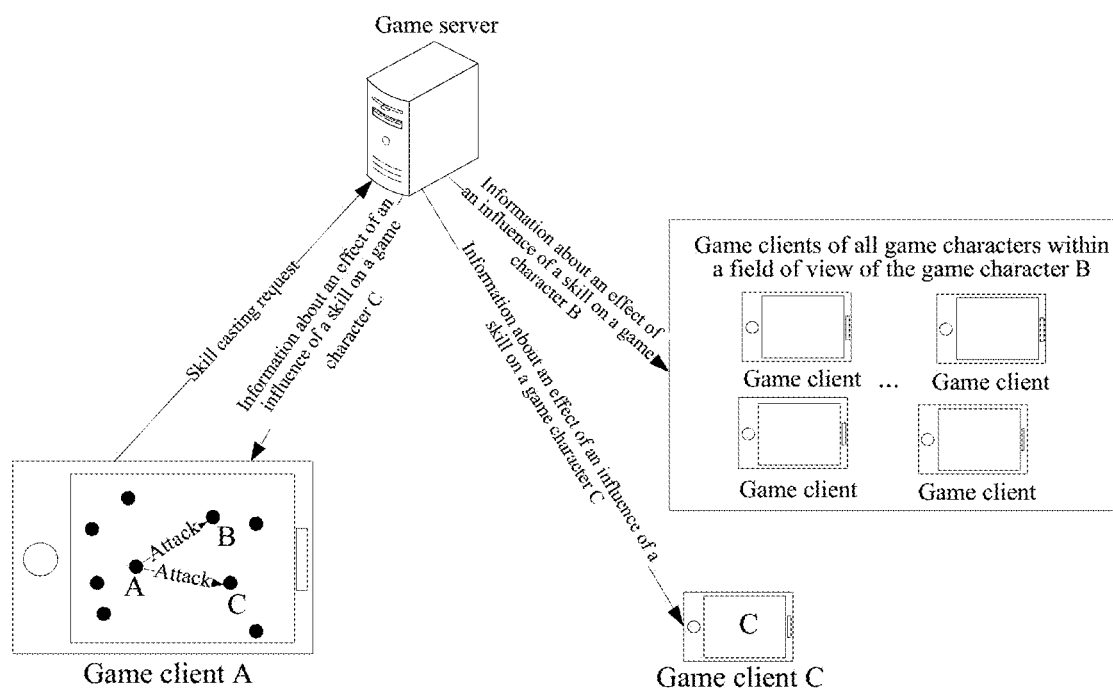
FIG. 8 is a schematic diagram showing that a game server instructs a game client to present a skill effect.

As shown in FIG. 8, after a game character A casts a debuff skill (for example, a damage skill) on game characters B and C, a game server may calculate remaining hit points of the game characters B and C. If the remaining hit points of the game character B are zero, that is, the game character B is dead, the remaining hit points of the game character B meet the preset condition, and the game server may broadcast information about an effect of the influence of the skill on the game character B to game clients of all game characters within a field of view of the game character B. The information about the effect may carry damage points and the remaining hit points of the game character B. The game clients of all the game characters within the field of view of the game character B may present the damage points of the game character B influenced by the skill. In addition, when the remaining hit points game character B are zero, presentation of an effect of death of the game character B is triggered (for example, if the game character B is dead, the game character B is triggered to fall to the ground).

If the remaining hit points of the game character C calculated by the game server are not zero, it may be determined that the remaining hit points of the game character C does not meet the preset condition. The game server may broadcast information about an effect of the influence of the skill on the game character C to a game client of the game character C and a game client of the game character A. The information about the effect may carry damage points and the remaining hit points of the game character C. The game client of the game character C and the game client of the game character A may present the damage points of the game character C influenced by the skill.

Obviously, the game character A may alternatively cast a buff skill (for example, a healing skill) to another game character. For each game character at which the buff skill is targeted, the game server may broadcast information about an effect of an influence of the buff skill on the game character to a game client of the game character and the game client of the game character A.

According to the information processing method provided in this embodiment of the present disclosure, in a phase in which the server broadcasts to the client to present an action of skill casting by a virtual object, and a phase in which the server broadcasts to the client to present an effect of an influence of the skill on the virtual object, an amount of information delivered by a server to a client may be reduced and information processing pressure of the client is reduced. Through a test, in a game-type network application, compared with a manner of broadcasting to clients of all virtual objects within a field of view of a virtual object in the existing technology, broadcasting by the server to the client according to the information processing method provided in this embodiment of the present disclosure may have the following advantages:

In this embodiment of the present disclosure, in the phase in which the server broadcasts to the client to present the action of skill casting by the virtual object, a proportion of a quantity of broadcast downlink information packets in a total quantity of downlink packets can be reduced from 23% to 16%, and the proportion of the quantity of broadcast downlink information packets in the total quantity of downlink packets is reduced from 18% to 11%.

In the phase in which the server broadcasts to the client to present the effect of the influence of the skill on the virtual object, a proportion of a quantity of broadcast downlink information packets in a total quantity of downlink packets can be reduced from 17% to 6%, and the proportion of the quantity of broadcast downlink information packets in the total quantity of downlink packets is reduced from 37% to 7%.

It can be learned that, in this embodiment of the present disclosure, an amount of information delivered by the server to the client can be very likely reduced, and information processing pressure of the client can be very likely reduced.

The following describes an information processing apparatus provided in the embodiments of the present disclosure. The information processing apparatus described below and the information processing method described above may refer to each other.

Figure 9:
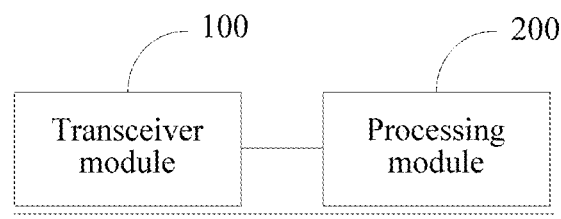
FIG. 9 is a structural block diagram of an information processing apparatus according to an embodiment of the present disclosure.

FIG. 9 is a structural block diagram of an information processing apparatus according to an embodiment of the present disclosure. The information processing apparatus may be applied to a client. Referring to FIG. 9, the information processing apparatus may include:

a transceiver module 100, configured to receive a skill casting request of a first virtual object sent by a first client, the skill casting request being used for requesting to cast a first skill; and a processing module 200, configured to determine a quantity of virtual objects within a field of view of the first virtual object in a virtual scene, where the processing module 200 in this embodiment of this application may be a software module and/or a hardware module, which is not specifically limited in this application;

select a target virtual object from the field of view of the first virtual object if the quantity of virtual objects within the field of view is greater than a predetermined threshold, where a quantity of target virtual objects corresponds to the predetermined threshold; and determine a first broadcast notification generated in response to the skill casting request, and send, by using the transceiver module 100, the first broadcast notification to a client of the target virtual object, the first broadcast notification being used for instructing to present an action of casting the first skill by the first virtual object.

Figure 10:
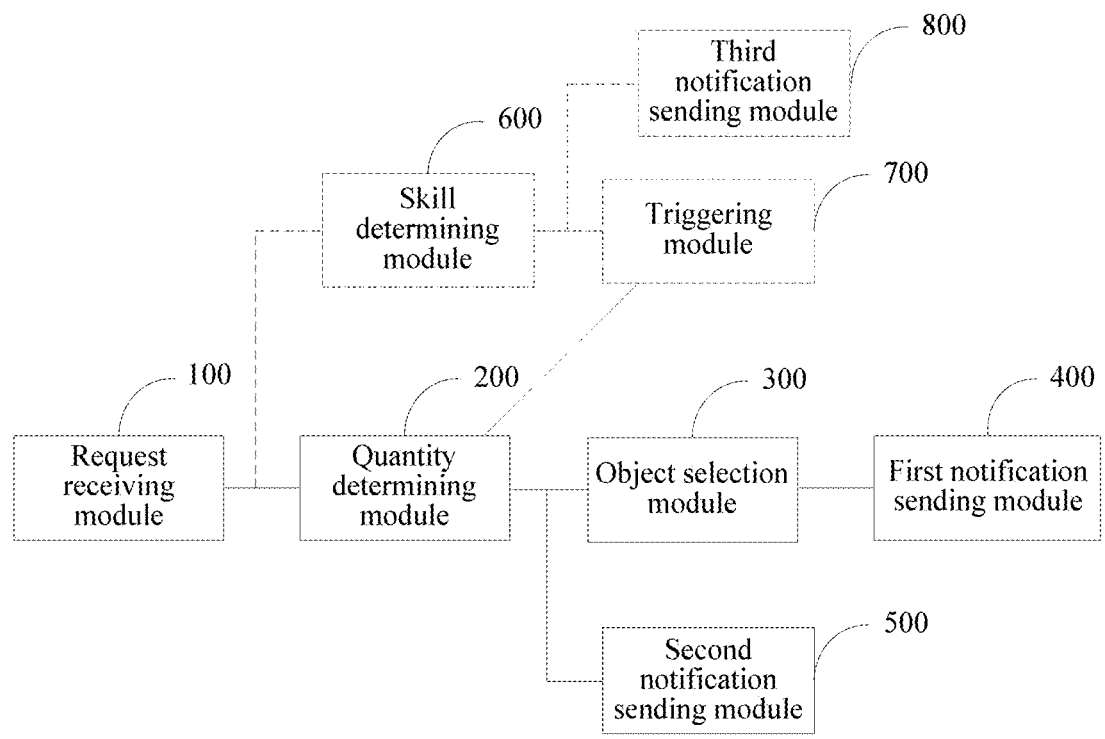
FIG. 10 is another structural block diagram of an information processing apparatus according to an embodiment of the present disclosure.

Optionally, FIG. 10 is another structural block diagram of an information processing apparatus according to an embodiment of the present disclosure. With reference to FIG. 9 and FIG. 10, the processing module 200 may further be configured to:

send, by using the transceiver module 100, the first broadcast notification to clients of all the virtual objects within the field of view of the first virtual object if the quantity of virtual objects within the field of view is less than or equal to the predetermined threshold.

Optionally, as shown in FIG. 10, the processing module 200 may further include:

a skill determining module 600, configured to determine whether the first skill adjusts a location of the first virtual object in the virtual scene; and a triggering module 700, configured to trigger, if the first skill does not adjust the location of the first virtual object in the virtual scene, the quantity determining module to determine the quantity of virtual objects within the field of view of the first virtual object in the virtual scene; or determine, if the first skill adjusts the location of the first virtual object in the virtual scene, an adjusted location of the first virtual object in the virtual scene, and send, by using the transceiver module 100 to the clients of all the virtual objects within the field of view of the first virtual object, a broadcast notification for adjusting the location of the first virtual object in the virtual scene to the adjusted location.

Optionally, the processing module 200 may further be configured to:

determine a coordinate range corresponding to the field of view of the first virtual object by using coordinates of the first virtual object as a center; and match coordinates of each virtual object in the virtual scene with the coordinate range, to determine a quantity of virtual objects whose coordinates fall within the coordinate range, to obtain the quantity of virtual objects.

Optionally, the processing module 200 may further include:

an object selection module 300, configured to randomly select target virtual objects whose quantity corresponds to the predetermined threshold from the field of view of the first virtual object; or determine various types of groups to which all the virtual objects within the field of view of the first virtual object belong, and select target virtual objects whose quantity corresponds to the predetermined threshold from the field of view of the first virtual object, a corresponding quantity of target virtual objects in each type of group meeting a set requirement; or select, according to relationship degrees between the virtual objects within the field of view of the first virtual object and the first virtual object, target virtual objects whose quantity corresponds to the predetermined threshold.

Figure 11:
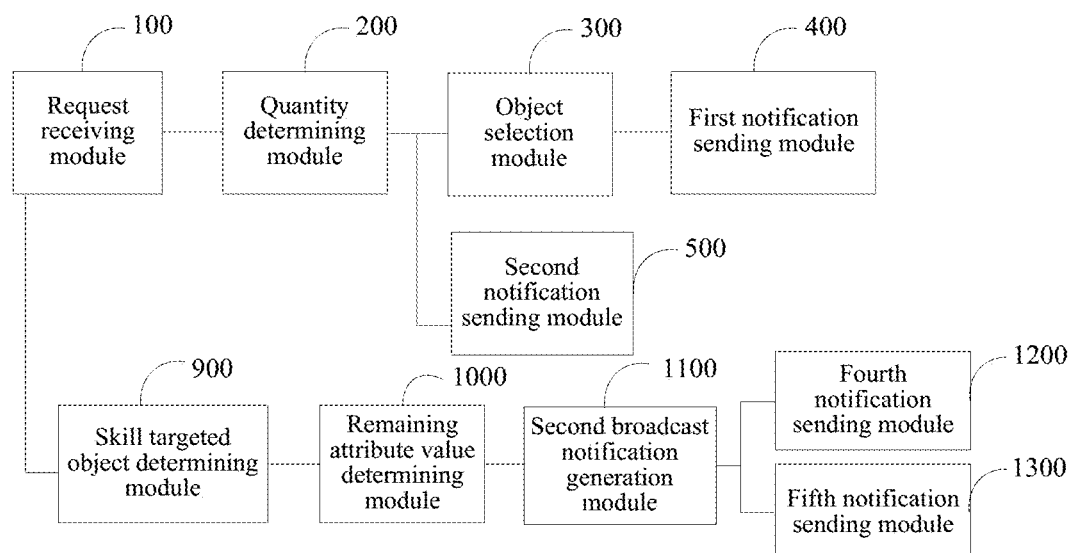
FIG. 11 is still another structural block diagram of an information processing apparatus according to an embodiment of the present disclosure.

Optionally, FIG. 11 is still another structural block diagram of an information processing apparatus according to an embodiment of the present disclosure. With reference to FIG. 9, the processing module 200 may further include:

a skill targeted object determining module 900, configured to determine, according to the skill casting request, at least one second virtual object at which the first skill is targeted;

a remaining attribute value determining module 1000, configured to determine a remaining attribute value of each second virtual object influenced by the first skill; and a second broadcast notification generation module 1100, configured to generate a second broadcast notification corresponding to each second virtual object according to a remaining attribute value of the second virtual object influenced by the first skill;

for a second virtual object whose remaining attribute value meets a preset condition, send, by using the transceiver module 100, a second broadcast notification corresponding to the second virtual object to clients of all virtual objects within a field of view of the second virtual object, the second broadcast notification being used for instructing to present an effect of the influence of the first skill on the second virtual object; and for a second virtual object whose remaining attribute value does not meet the preset condition, send, by using the transceiver module 100, a second broadcast notification corresponding to the second virtual object to a client of the second virtual object and the first client.

Optionally, the skill targeted object determining module 900 is specifically configured to:

determine, according to a virtual object list carried in the skill casting request, the at least one second virtual object at which the first skill is targeted, the virtual object list recording the at least one second virtual object at which the first skill cast by the first virtual object is targeted.

Optionally, the remaining attribute value includes remaining hit points, and that the remaining attribute value meets a preset condition includes: the remaining hit points are zero.

Optionally, the first skill is an attack skill, the second broadcast notification includes lost hit points and remaining hit points of the second virtual object attacked by the first skill, and a death event of the second virtual object is triggered if the remaining hit points are zero.

The information processing apparatus provided in this embodiment of the present disclosure can reduced an amount of information delivered by a server to a client and reduce information processing pressure of the client in a phase in which the server delivers a notification to the client to present an action of skill casting by another virtual object, and a phase in which the server broadcasts to the client to present an effect of an influence of a skill on the virtual object.

The embodiments of the present disclosure further provide a server. The server may include the foregoing information processing apparatus.

Figure 12:
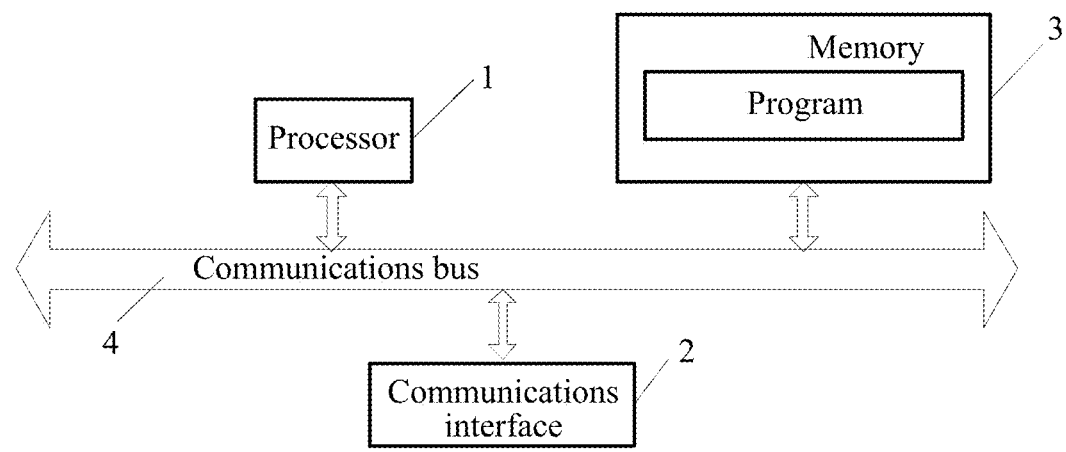
FIG. 12 is a structural hardware block diagram of a server.

Optionally, FIG. 12 is a structural hardware block diagram of a server. Referring to FIG. 12, the server may include a processor 1, a communications interface 2, a memory 3, and a communications bus 4.

The processor 1, the communications interface 2, and the memory 3 communicate with one another by using the communications bus 4.

Optionally, the communications interface 2 may be an interface of a communications module, for example, an interface of a GSM module.

The processor 1 may be a central processing unit (CPU), or an application-specific integrated circuit (ASIC), or one or more integrated circuits configured to implement this embodiment of the present disclosure.

The memory 3 may include a high-speed RAM, or may further include a non-volatile memory, for example, at least one magnetic disk memory.

The processor 1 is specifically configured to:

receive a skill casting request of a first virtual object sent by a first client, the skill casting request being used for requesting to cast a first skill;

determine a quantity of virtual objects within a field of view of the first virtual object in a virtual scene;

select a target virtual object from the field of view of the first virtual object if the quantity of virtual objects within the field of view is greater than a predetermined threshold, where a quantity of target virtual objects corresponds to the predetermined threshold; and determine a first broadcast notification generated in response to the skill casting request, and send the first broadcast notification to a client of the target virtual object, the first broadcast notification being used for instructing to present an action of casting the first skill by the first virtual object.

It should be noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Persons skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the embodiments of the present disclosure.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above description of the disclosed embodiments enables persons skilled in the art to implement or use the present disclosure. Various modifications to these embodiments are obvious to persons skilled in the art, the general principles defined in the present disclosure may be implemented in other embodiments without departing from the spirit and scope of the present disclosure. Therefore, the present disclosure is not limited to these embodiments illustrated in the present disclosure, but needs to conform to the broadest scope consistent with the principles and novel features disclosed in the present disclosure.

The embodiments of the present disclosure provide a method for processing a virtual object in an application and a mobile terminal, so that the mobile terminal performs a corresponding operation in each ring operating range. There is an appropriate operation arrangement for each ring operating range, preparing for final display of a rendered target virtual object, optimizing resource allocation when a large quantity of virtual objects are displayed on a same screen, reducing a probability that frame freezing occurs, and further optimizing a frame rate (Frames per second).

To make the solutions of the present disclosure more comprehensible for persons skilled in the art, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. Based on the embodiments in the present disclosure, the described embodiments shall fall within the protection scope of the present disclosure.

Figure 13:
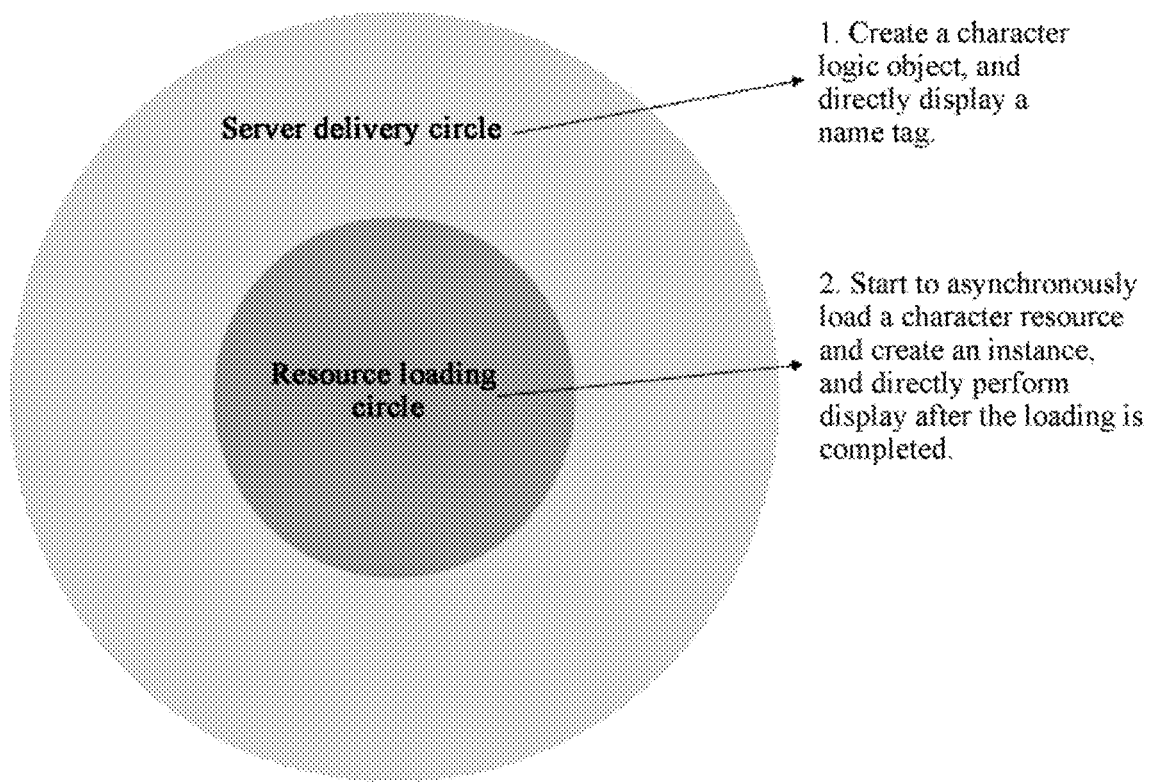
FIG. 13 is a schematic diagram of managing a visual field circle of a virtual object according to an embodiment of the present disclosure.

In a game with a large-scale multi-player one-screen character display requirement, for each character, a character model is displayed in a game scene, that is, a player character instance. The virtual object may be commonly referred to as a character. Some multi-player network games in the existing technology are implemented based on a Gamebryo engine modified according to a project requirement modify, and there are only two layers: a server delivery circle and a resource loading circle. FIG. 13 is a schematic diagram of managing a visual field circle of a virtual object. After a character enters the server delivery circle, a logic object and a name tag of the character are immediately created. After a player further enters the resource loading circle, a character resource starts to be asynchronously loaded, and after the loading is completed, a character model instance is immediately created and displayed. However, operations such as resource loading, instance creation, and rendering need to be performed in the resource loading circle, and performance of both a CPU and a GPU on a PC platform is much better than that of a mobile end device such as a mobile phone. Therefore, frame freezing rarely occurs provided that the resource loading circle is used to implement asynchronous resource loading and character instance creation operations. However, a mobile device with limited performance and strict requirements on power consumption quantity and heat release leads to poor experience, and frame freezing often occurs when these operations are performed.

The following first defines some abbreviations and key terms used in the technical solutions of the present disclosure:

Unity: a 3D game engine widely used in the industry, provides fundamental functions and some development tools for game development, and can greatly improve product development efficiency. However, there are some problems in performance and applicability to specific types of games, and a project team needs to perform improvement.

Prefab: a basic management unit of art resources in the Unity engine, can store a model, a map, or an animation of art production in a pre-edited file.

Game Object: an object during running of a game in the Unity engine, and different characters and models need to create different GameObject objects for display.

Character instance: each player in a large-scale multi-player network game controls a character in the game, and a character model, that is, a player character instance is displayed in a scene for each character.

Instantiation: a plurality of characters may use a same resource (template) in art performance, but are displayed as a plurality of object instances in performance. Instantiation refers to a process of creating a plurality of game object instances according to art resources.

Dress replacement: when a player is equipped with different weapons or wears different costumes, appearance of a character model of the player changes accordingly, and this process is referred to as dress replacement.

A name tag: an information panel suspended above a character model, and used for displaying text such as a player name, a family name, or a title.

Figure 14:
FIG. 14 is a schematic diagram showing that a plurality of virtual objects is displayed on a same screen on a mobile terminal according to an embodiment of the present disclosure.

The technology is mainly applied in the following scenario: in a game with a large-scale multi-player one-screen character display requirement, when numerous players dynamically enter or go out of a screen visual field, player character rendering calculation overheads and character creation/deletion frame freezing overheads are reduced to the greatest extent. FIG. 14 is a schematic diagram showing that a plurality of virtual objects is displayed on a same screen. Main problems of the existing technology are as follows:

Loading overheads of resources such as the Prefab and a model, a texture, and an animation that are included in the Prefab; Prefab instantiation overheads; rendering overheads; animation update overheads; and engine data update overheads when GameObject is enabled. The technical solutions of present disclosure can effectively resolve these performance problems.

Figure 15:
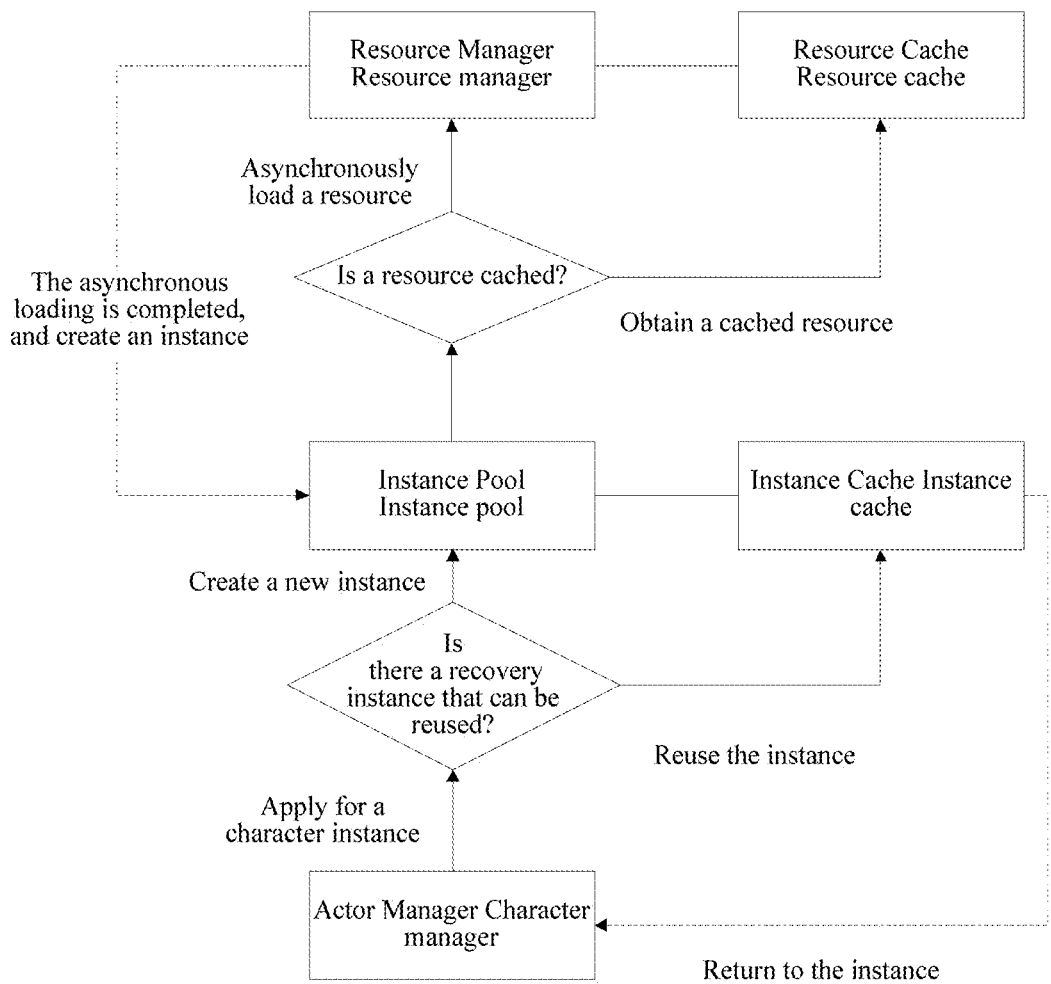
FIG. 15 is a schematic frame diagram of a resource manager and a character instance object pool according to an embodiment of the present disclosure.

FIG. 15 is a schematic frame diagram of a resource manager and a character instance object pool. The technical principle is described below. In FIG. 15, a character manager Actor Manager is responsible for managing all player character object program classes. When a character instance needs to be created for a new character, an application is submitted by using an instance pool Instance Pool. The instance pool Instance Pool first attempts to use an existing idle object instance in a recovery pool of an instance cache Instance Cache before creating a new instance, to avoid overheads of creating a new instance.

When the instance pool Instance Pool create a resource that is required by an instance, the instance pool loads a resource by using the resource manager Resource Manager. The resource manager Resource Manager includes a resource index list, and when a same resource is cited, the resource can be directly extracted, to avoid reloading the resource through a Unity engine interface with high overheads.

It should be noted that, FIG. 15 shows merely a brief description in design. During specific implementation, a character instance object pool, a special effect instance object pool, a weapon component object pool, and other targeted types may further be obtained through division to specialize implementation and delay unloading algorithms for distinguishing.

Figure 16:
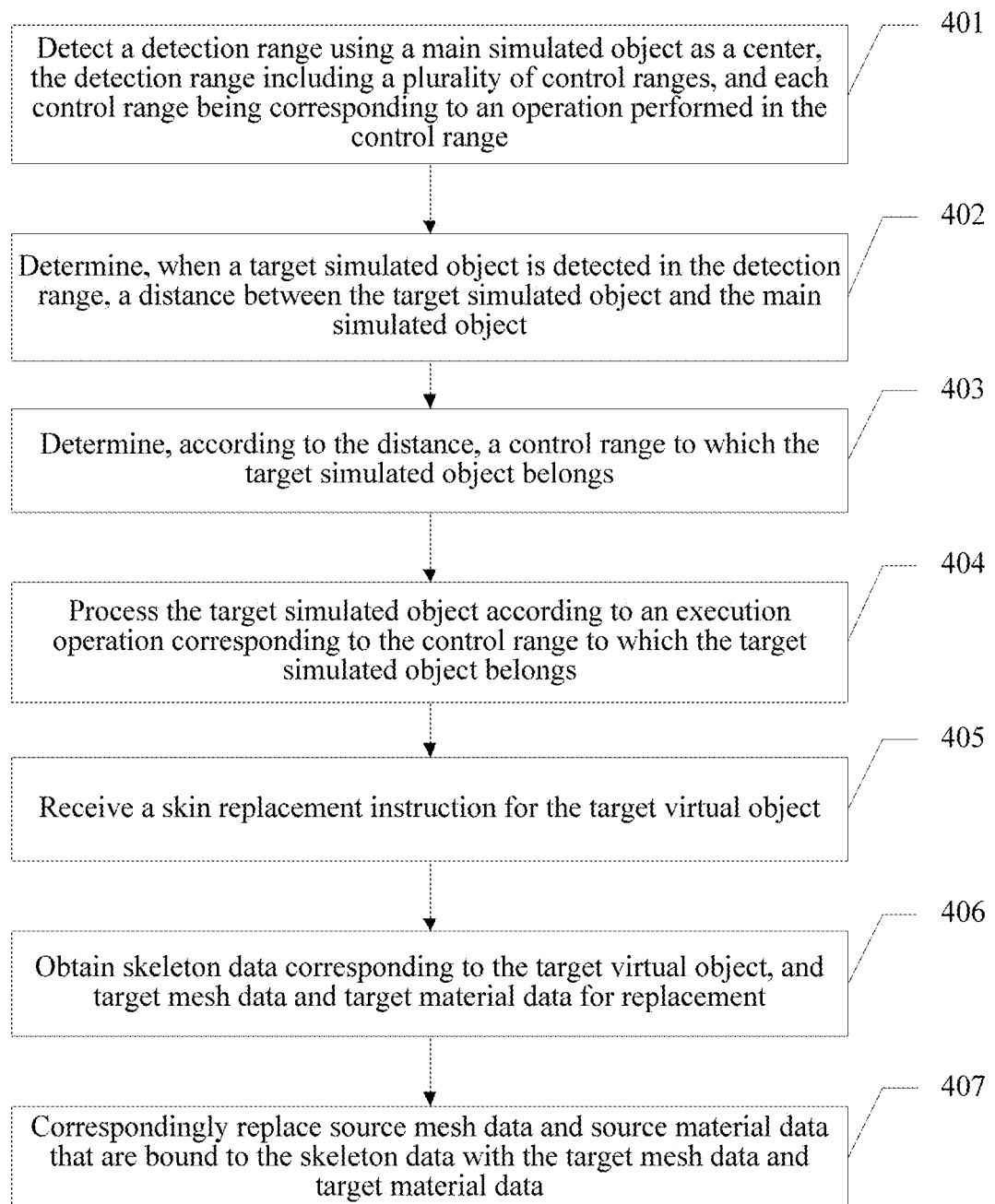
FIG. 16 is a schematic embodiment diagram of a method for processing a virtual object in an application according to an embodiment of the present disclosure.

The following further describes the technical solutions of the present disclosure by using embodiments. The technical solutions are mainly applied to an interactive application, in which a plurality of virtual objects is displayed on a same screen, on a mobile terminal. A main virtual object is displayed on a display interface of the interactive application. The interactive application may be referred to as a client installed on the mobile terminal. FIG. 16 is a schematic embodiment diagram of a method for processing a virtual object in an application according to an embodiment of the present disclosure. The method includes:

401. The mobile terminal detects a detection range using the main virtual object as a center, the detection range including a plurality of control ranges, each control range being in a one-to-one correspondence with an operation in the control range, and the operation being an operation performed by a virtual object entering the control range.

In this embodiment of the present disclosure, the mobile terminal detects the detection range using the main virtual object as a center. The detection range includes the plurality of control ranges. The plurality of control ranges is concentric control ranges having different distances from the center, and each control range corresponds to an operation performed in the control range. The virtual object in this application may also be referred to as a virtual object.

Figure 17:
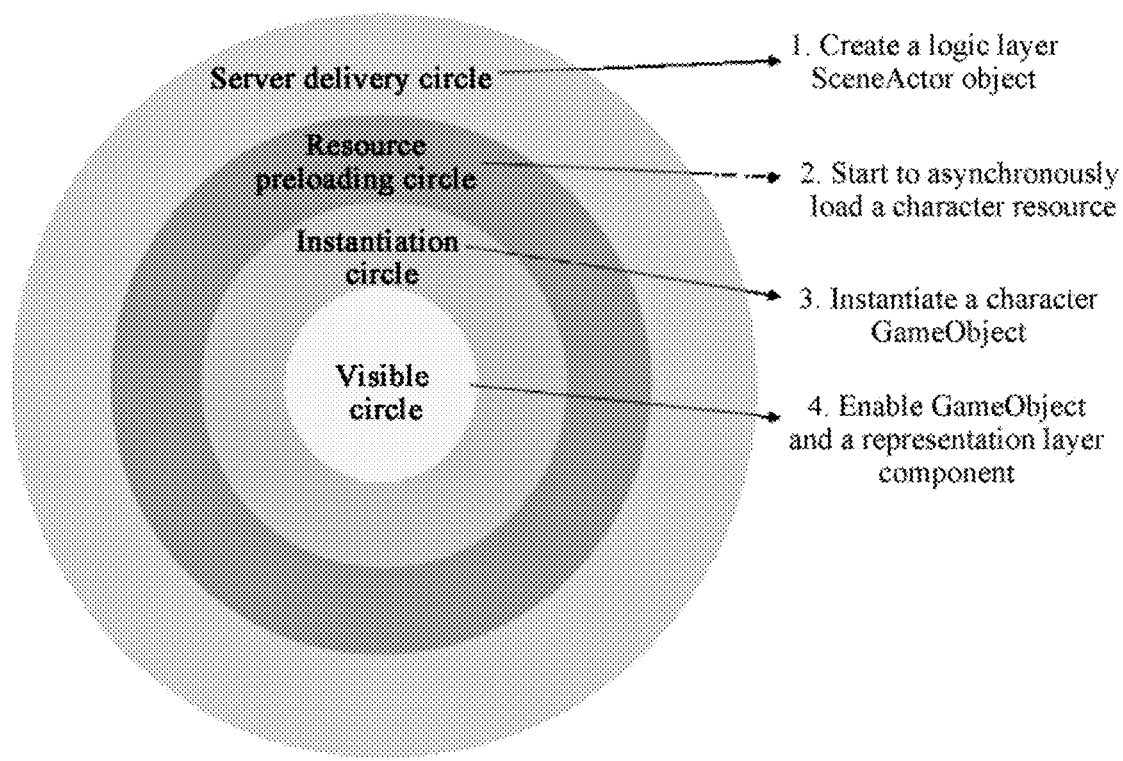
FIG. 17 is another schematic diagram of managing a visual field circle of a virtual object according to an embodiment of the present disclosure.

For example, based on character management in a visual field circle, FIG. 17 is a schematic diagram of visual field circle management of a plurality of virtual objects on a mobile terminal. The plurality of control ranges may be four layers of character visual field circles that are set by using a main character as a center point: a server delivery circle, a resource preparation circle, a character instantiation circle, and a visible circle. The resource preparation circle may also be referred to as a resource loading circle, and the visible circle is also referred to as a visual circle. In addition, a corresponding program algorithm policy is configured, to reduce frame freezing. That is, rendering calculation pressure when numerous player characters are displayed on a same screen and character loading and deletion pressure when the characters repeatedly enter or go out of a visual field, and the like can be alleviated.

It should be noted that, the control ranges herein may be a plurality of circles with different radii using the main character as the center, or may be square, elliptical, or other shapes of character visual field circles. This is not specifically limited. In addition, there are at least three control ranges, and each control range performs a corresponding operation.

The mobile terminal herein may include any terminal device such as a mobile phone, a tablet computer, a personal digital assistant (PDA), or an on-board computer. It should be understood that, the target virtual object and the main virtual object herein are characters in a game, for example, may be characters such as a general and a soldier in a game, and names may be Siliedetiantang, Fengchuipiyashuang, Mini'shihun, Bufulaima, Congxiaolizhidangjianke, Jiejiao, Shahongyan, and the like.

402. Determine, when a target virtual object is detected in the detection range, a distance between the target virtual object and the main virtual object.

In this embodiment of the present disclosure, when the mobile terminal detects the target virtual object in the detection range, the mobile terminal determines the distance between the target virtual object and the main virtual object. The main virtual object herein is a main character, and the target virtual object may be a target character that is already online previously, or may be a target character that has just been online and currently appears in a detection range that can be detect by the main character. In this way, a distance between the main character and the target character can be determined.

403. Determining, according to the distance, a control range in which the target virtual object is located.

In this embodiment of the present disclosure, when the mobile terminal detects the target virtual object in the detection range, the mobile terminal determines the distance between the target virtual object and the main virtual object, and then the mobile terminal determines, according to the distance, the control range to which the target virtual object belongs.

As shown in FIG. 17, distances between the plurality of control ranges and the center are arranged in descending order, including: a server delivery range, a resource loading range, an instantiation range, and a visual range. In this case, the control range to which the target virtual object belongs and that is determined by the mobile terminal according to the distance may be a server delivery range, a resource loading range, an instantiation range, or a visual range. To be specific, if the distance is 8 m, the control range to which the target virtual object belongs is a server delivery range. If the distance is 6 m, the control range to which the target virtual object belongs is a resource loading range. If the distance is 4 m, the control range to which the target virtual object belongs is an instantiation range. If the distance is 2 m, the control range to which the target virtual object belongs is a visual range. It should be understood that, the unit m herein uses a meter in a virtual game world as a unit.

404. Process the target virtual object according to an operation performed in the control range in which the target virtual object is located.

In this embodiment of the present disclosure, after determining, according to the distance, the control range to which the target virtual object belongs, the mobile terminal processes the target virtual object according to an execution operation corresponding to the control range to which the target virtual object belongs.

As shown in FIG. 17, specifically, the processing the target virtual object according to an execution operation corresponding to the control range to which the target virtual object belongs includes at least one the following:

(1) creating a logic object for the target virtual object and displaying a name tag corresponding to the target virtual object for which the logic object has been created, when the control range to which the target virtual object belongs includes the server delivery range; or (2) loading a corresponding resource for the target virtual object when the control range in which the target virtual object is located includes the resource loading range; or (3) creating a target instance corresponding to the target virtual object by using a resource loaded for the target virtual object, when the control range in which the target virtual object is located includes the instantiation range; or (4) performing rendering calculation on a target instance and displaying a rendered target virtual object, when the control range in which the target virtual object is located includes the visible range.

It should be noted that, optionally, in some possible implementations, the mobile terminal includes a resource cache. In this case, the loading a corresponding resource for the target virtual object may include:

① extracting, if the resource cache includes a target resource for creating an instance for the target virtual object, the target resource from the resource cache; or ② if the resource cache does not include a target resource for creating an instance for the target virtual object, asynchronously loading the target resource.

In addition, optionally, in some possible implementations, the mobile terminal may further include an instance cache. Before the performing rendering calculation on the target instance and displaying a rendered target virtual object, the following step may further be performed:

if the instance cache includes a target instance corresponding to the target virtual object, reusing the target instance; and the performing rendering calculation on a target instance and displaying a rendered target virtual object may include: performing rendering calculation on the target instance and displaying the rendered target virtual object.

Optionally, in some possible implementations, the creating a target instance corresponding to the target virtual object by using a corresponding resource may include: obtaining, if the instance cache does not include a target instance corresponding to the target virtual object, a target resource for creating an instance for the target virtual object; and using the target resource to create the target instance.

The following further describes different operations performed in different control ranges when the target character is online for the first time:

1. The control range to which the target character belongs is the server delivery circle, and the target character continuously moves to pass through the resource loading circle, the instantiation circle, and the visual circle.

(1) If the target character is currently in the server delivery circle, the mobile terminal performs determining on the target character, to determine whether a logic object has been created. If no logic object has been created, the mobile terminal creates a logic object of the target character, and displays a name tag of the target object. If the logic object has been created, the mobile terminal directly displays the name tag of the target object.

(2) When the target character moves into the resource loading circle, the mobile terminal still first determines whether a logic object has been created for the target character. If the logic object has been created, the mobile terminal loads a resource for the target character. Certainly, because the target character moves from the server delivery circle to the resource loading circle herein, a result of the determining is that the logic object has been created. If no logic object has been created, the mobile terminal first creates a logic object for the target character, and then loads a resource.

Further, when the mobile terminal loads the resource for the target character herein, the mobile terminal may first determine whether a resource of the target character is stored in the resource cache, and if yes, the mobile terminal may directly reuse the resource, or if no, the mobile terminal needs to use the resource manager to create, for the target character, a resource required for asynchronous instance loading. It should be noted that, when the target character in the resource loading circle, the mobile terminal still displays the name tag of the target character.

(3) When the target character moves into the character instantiation circle, the mobile terminal still first determines whether a logic object has been created for the target character. If the logic object has been created, the mobile terminal loads a resource for the target character. Certainly, because the target character moves from the server delivery circle to the resource loading circle and then to the character instantiation circle herein, a result of the determining is that the logic object has been created. If no logic object has been created, the mobile terminal first creates a logic object for the target character, and then loads a resource.

Further, when the mobile terminal loads the resource for the target character herein, the mobile terminal may first determine whether a resource for creating an instance for the target character is stored in the resource cache, and if yes, the mobile terminal may directly reuse the resource, or if no, the mobile terminal needs to use the resource manager to create, for the target character, a resource required for asynchronous instance loading.

Still further, the mobile terminal may create an instance for the target character by using a resource obtained by the resource loading circle. When the target character is in the character instantiation circle, the target character is not displayed, that is, without rendering and instance update calculation overheads, the mobile terminal still displays the name tag of the target character.

(4) When the target character moves into the visual circle, the mobile terminal still first determines whether a logic object has been created for the target character. If the logic object has been created, the mobile terminal loads a resource for the target character. Certainly, because the target character moves from the server delivery circle to the resource loading circle, then moves to the character instantiation circle, and then finally moves to the visual circle herein, a result of the determining is that the logic object has been created. If no logic object has been created, the mobile terminal first creates a logic object for the target character, and then loads a resource.

Further, when the mobile terminal loads the resource for the target character herein, the mobile terminal may first determine whether a resource for creating an instance for the target character is stored in the resource cache, and if yes, the mobile terminal may directly reuse the resource, or if no, the mobile terminal needs to use the resource manager to create, for the target character, a resource required for asynchronous instance loading.

Still further, the mobile terminal may create an instance for the target character by using a resource obtained by the resource loading circle. When the target character is in the character instantiation circle, the target character is not displayed, that is, without rendering and instance update calculation overheads, the mobile terminal still displays the name tag of the target character.

Finally, the mobile terminal enables a created character instance for the target character, performs actual rendering and calculation, and displays a rendered target character on the mobile terminal.

It should be noted that, in the description of "1", when a control range to which the target character that is online belongs is the server delivery circle, for a case in which the target character continuously moves to pass through the resource loading circle, and stops moving or goes offline, or continuously moves to pass through the resource loading circle and the instantiation circle, and then stops moving or goes offline, the foregoing description can be referenced. Details are not described herein again.

2. The control range to which the target character belongs is the visual circle, and the target character continuously moves to pass through the instantiation circle, the resource loading circle, and the server delivery circle.

(1) If the target character goes online for the first time to appear in the visual circle, the mobile terminal first determines whether a logic object has been created for the target character, and if no logic object has been created, the mobile terminal creates a logic object of the target character; or if a logic object has been created, the mobile terminal directly reuses the logic object that has been created. If no logic object has been created, the mobile terminal creates a pure logic character object for the target application.

Next, the mobile terminal determines whether an instance has been created for the target character. If an instance has been created, the mobile terminal may reuse an instance of the target character from the instance cache, to achieve reutilization of the instance, and avoid overheads for creating a new instance. If no instance has been created, the mobile terminal needs to obtain a resource for creating an instance for the target character.

Further, to obtain the resource for creating an instance for the target character, the mobile terminal may first determine whether a resource of the target character has been cached, and if yes, the mobile terminal may directly extract the cached resource from the resource cache; or if no, the mobile terminal needs to use the resource manager to perform asynchronous resource loading, to obtain the resource for creating an instance for the target character.

Still further, the mobile terminal uses the obtained resource to create an instance for the target character.

Finally, the mobile terminal enables the created instance of the target character, performs actual rendering and calculation, and displays a rendered target character, that is, displays the character, on the mobile terminal.

(2) When the target character moves into the instantiation circle, the mobile terminal further determines whether a logic object has been created for the target character, and if no, the mobile terminal creates a logic object of the target character; or if yes, the mobile terminal determines whether an instance of the target character has been created, and if the instance of the target character has been created, the mobile terminal directly reuses the instance from the instance cache; or if no instance of the target character has been created, the mobile terminal needs to obtain a resource for creating an instance of the target character, and use the resource to create an instance of the target character.

To obtain a resource for creating an instance of the target character, the mobile terminal may alternatively first determine whether the resource for creating an instance of the target character has been cached, and if yes, the mobile terminal may directly extract the cached resource, or if no, the mobile terminal needs to use the resource manager to asynchronously load a resource required for creating the target instance.

To obtain a resource for creating an instance for the target character, the mobile terminal may use the resource to create an instance of the target character. However, in this case, a name tag of the target character is displayed on the mobile terminal.

(3) When the target character moves into the resource loading circle, the mobile terminal further determines whether a logic object has been created for the target character, and if yes, the mobile terminal obtains a resource for creating an instance for the target character; or if no, the mobile terminal creates a logic object of the target character. That the mobile terminal obtains a resource for creating an instance for the target character may alternatively include: the mobile terminal determines whether the resource for creating an instance of the target character has been cached, and if yes, the mobile terminal may directly extract the cached resource; or if no, the mobile terminal needs to use the resource manager to asynchronously load a resource required for creating the target instance. In this case, a name tag of the target character is still displayed on the mobile terminal.

(4) When the target character moves into the server delivery circle, the mobile terminal further determines whether a logic object has been created for the target character, and if yes, the mobile terminal directly uses the logic object, or if no, the mobile terminal creates a logic object of the target character.

It should be noted that, in the description of "2", when a control range to which the target character that is online belongs is the visual circle, for a case in which the target character may continuously move to pass through the instantiation circle, and stops moving or goes offline, or the target character may continuously move to pass through the instantiation circle and the resource loading circle, and then stops moving or goes offline, the foregoing description can be referenced. Details are not described herein again.

It should be understood that, the foregoing description is provided merely for one target character. In an actual application, during multi-player one-screen display, numerous target characters are included, and each target character is processed by using a method similar to the foregoing method. With reference to the technologies of the resource manager, the instance object pool, and the visual field circle management, resource loading and instance creation/deletion overheads when characters repeatedly enter or go out of a visual field are greatly reduced. In addition, with a dynamic parameter adjustment mechanism according to hardware performance and a real-time frame rate, and a character hiding policy designed according to a game play method, rendering and calculation overheads of displaying numerous characters on a same screen are ingeniously reduced.

405. Receive a skin replacement instruction for the target virtual object.

In this embodiment of the present disclosure, the mobile terminal receives the skin replacement instruction for the target virtual object. The target virtual object herein may be a main character, or may be another target character. It should be noted herein that, before the mobile terminal performs skin replacement on the main character or the target character, integrity of a skeleton and a model needs to be ensured. The skin replacement herein may also be referred to as dress replacement.

In a role-playing game (RPG) type of game, there is usually a functional requirement on synchronously switching an appearance skin during weapon replacement for a character. When numerous characters enter or go out of a visual field or switch weapons, because numerous resources are loaded to switch display skins, serious frame freezing is caused.

406. Obtain skeleton data corresponding to the target virtual object, target mesh data, and target material data.

In the existing technology, implementation steps officially provided by the Unity engine are:

1. Load a Prefab of a new skin.
2. Instantiate the Prefab of the new skin.
3. Replace a model node in an original instance with a model node in a new instance.
4. Traverse all skeleton nodes of the original instance according to skeleton names, and re-sort skeleton indexes in a skinned mesh renderer according to a result.

In this embodiment of the present disclosure, after receiving the skin replacement instruction for the target virtual object, the mobile terminal obtains the skeleton data corresponding to the target virtual object, and the target mesh data and the target material data for replacement. That is, the mobile terminal may directly load mesh and material resources of the new skin (where consistency of skeletons derived from the model needs to be ensured).

407. Replace source mesh data bound to the skeleton data with the target mesh data, and replace source material data bound to the skeleton data with the target material data.

In this embodiment of the present disclosure, after obtaining the skeleton data corresponding to the target virtual object, and the target mesh data and the target material data for replacement, the mobile terminal correspondingly replaces the source mesh data and the source material data that are bound to the skeleton data with the target mesh data and target material data.

That is, the mobile terminal directly uses the mesh and the material for replacement in the skinned mesh renderer. After the modification, because Prefab hierarchical loading and instantiation steps are omitted, skin replacement overheads are greatly reduced. When numerous players enter or go out of a visual field, original experience of frame freezing of the mobile terminal is greatly improved. In a dress replacement optimization mechanism, integrity of a skeleton and a model is ensured, Prefab hierarchical instantiation steps of the Unity engine are omitted, and a method for directly replacing an underlying node model and a material resource is used, so that efficiency of executing a skin replacement program is improved.

It should be noted that, steps 405 to 407 are optional steps. In an actual application, whether steps 405 to 407 are performed may be determined according to an actual requirement. In addition, a sequential order of steps 405 to 407 and a sequential order of steps 401 to 404 are not limited.

It should be understood that, the technical solutions mentioned in this specification are merely intended to describe an overall design idea, and specified algorithms may be derived for different projects. For example, the visual field circle may not use a resource preloading circle or a visual circle, but is combined into another circle. A specific skin replacement algorithm may also be replaced together with some skeletons, or the material is directly replaced, and the skin and the Prefab are loaded together.

In the embodiments of the present disclosure, the method is applied to the interactive application, in which the plurality of virtual objects is displayed on the same screen, on the mobile terminal. The main virtual object is displayed on the display interface of the interactive application. The mobile terminal detects the detection range using the main virtual object as a center. The detection range includes the plurality of control ranges. The plurality of control ranges is concentric control ranges having different distances from the center, the plurality of control ranges does not overlap one another, and each control range corresponds to an operation performed in the control range. When the target virtual object is detected in the detection range, the distance between the target virtual object and the main virtual object is determined. The control range to which the target virtual object belongs is determined according to the distance. The target virtual object is processed according to an execution operation corresponding to the control range to which the target virtual object belongs. Because the mobile terminal performs a corresponding operation in each control range, there is an appropriate operation arrangement for each control range, preparing for final display of a rendered target virtual object, optimizing resource allocation when a large quantity of virtual objects are displayed on a same screen, and reducing a probability that frame freezing occurs.

By using the resource manager and the instance object pool in combination with the visual field circle management technology, resource loading and instance creation/deletion overheads when characters repeatedly enter or go out of a visual field are greatly reduced. In addition, with a dynamic parameter adjustment mechanism according to hardware performance and a real-time frame rate, and a character hiding policy designed according to a game play method, rendering and calculation overheads of displaying numerous characters on a same screen are ingeniously reduced. The optimization in the character skin replacement mechanism is targeted at project features, and based on the foregoing technology, inevitable resource loading and switching overheads during weapon replacement are further improved.

The following further describes the technical solutions of the present disclosure by using an actual application scenario. As shown below:

In a multi-role playing game on a mobile phone, it is assumed that a main character is Aozhan, a target character 1 is Kaiguomengjiang, a target character 2 is Zhenbianjiangjun, and a target character 3 is Zhenguanjiangjun.

On the mobile phone, the main character Aozhan is used as a center, and visual field circle management is divided into four circles shown in FIG. 17: a server delivery circle, a resource preparation circle, a character instantiation circle, and a visible circle. In this case, when the target character 1 is online, a distance S1 from the target character 1 to the main character is determined, and a ring operating range to which the target character 1 belongs is determined according to the distance S1. The ring operating range determined herein is a resource loading circle. The mobile phone performs determining on the target character 1, to determine whether a logic object has been created, and if yes, the mobile phone may load a resource for the target character 1; or if no logic object has been created, the mobile phone first needs to create a logic object for the target character 1, and then loads the resource. Further, during resource loading, it may be first determined whether a resource cache includes a resource of the target character 1, and if yes, the resource may be directly obtained, or if no, the mobile phone needs to asynchronously load a resource by using a resource manager. A name tag, that is, Kaiguomengjiang of the target character 1 is displayed in the resource loading circle.

The target character 1 subsequently further moves. The mobile phone obtains a distance between the target character 1 and the main character, and determines, according to the distance, a ring operating range to which the target character 1 belongs. When the target character 1 belongs to the server delivery circle, the mobile phone further performs determining on the target character 1, to determine whether a logic object has been created, and if yes, the mobile phone directly displays the name tag of the target character 1, or if no, the mobile phone first creates a logic object for the target character 1, and then displays the name tag, that is, Kaiguomengjiang, of the target character 1.

When the distance between the target character 1 and the main character is greater than a maximum diameter of the server delivery circle, the target character 1 is not displayed on the mobile phone, and the target character 1 may be offline, or may stay outside the server delivery circle, wandering.

When the target character 2 is online, it is determined, according to a distance S2 between the target character 2 and the main character that a ring operating range to which the target character 2 belongs falls in the visual circle. In this case, the mobile phone may first determine whether an instance has been created for the target character 2, and if yes, the target character may directly reuse the instance, to perform actual rendering and calculation, and display a rendered target character 2 (including a name tag, that is, Zhenbianjiangjun, of the target character 2) on the mobile phone. Because a resource of the created instance can be directly used, resource overheads are reduced.

If no instance has been created, the mobile phone performs determining on the target character 2, to determine whether a logic object has been created, and if yes, the mobile phone directly displays the name tag of the target character 2, or if no, the mobile phone creates a logic object for the target character. Then, the mobile phone determines whether a resource for creating an instance for the target character 2 has been cached, and if yes, the mobile phone may directly obtain the cached resource, thereby avoiding overheads resulted from repeated resource loading of the engine; or if no, the mobile phone needs to asynchronously load the resource.

When the mobile phone obtains the resource for creating an instance for the target character 2, the mobile phone uses the resource to create an instance for the target character 2. After creating the instance, the mobile phone enables the created character instance, to perform actual rendering and calculation, and display a rendered target character 2 (including the name tag, that is, Zhenbianjiangjun, of the target character 2).

When the target character 3 is online, the mobile phone determines a distance S3 between the target character 3 and the main character, and determines, according to the distance S3, that the target character 3 is located in the instantiation circle. The mobile phone first determines whether an instance has been created for the target character 3, and if yes, the mobile phone may directly reuse the instance from an instance cache, and does not need to create a new instance, thereby reducing resource overheads. If no instance has been created, the mobile phone needs to create an instance for the target character 3, and during instance creation, the mobile phone first needs to obtain a resource for creating an instance. When the resource cache includes a resource for creating an instance for the target character 3, the resource may be directly obtained; otherwise, the mobile phone needs to load a resource for creating an instance, and create, according to the obtained resource, an instance for the target character 3. In this case, a name tag, that is, Zhenguanjiangjun, of the target character 3 is displayed on the mobile phone.

If the target character 3 moves into the visual circle, the mobile phone may enable the created instance of the target character 3, to perform rendering and calculation, and display a rendered target character 3.

In this embodiment of the present disclosure, by using the resource manager and the instance object pool in combination with the visual field circle management technology, resource loading and instance creation/deletion overheads when characters repeatedly enter or go out of a visual field are greatly reduced.

Figure 18:
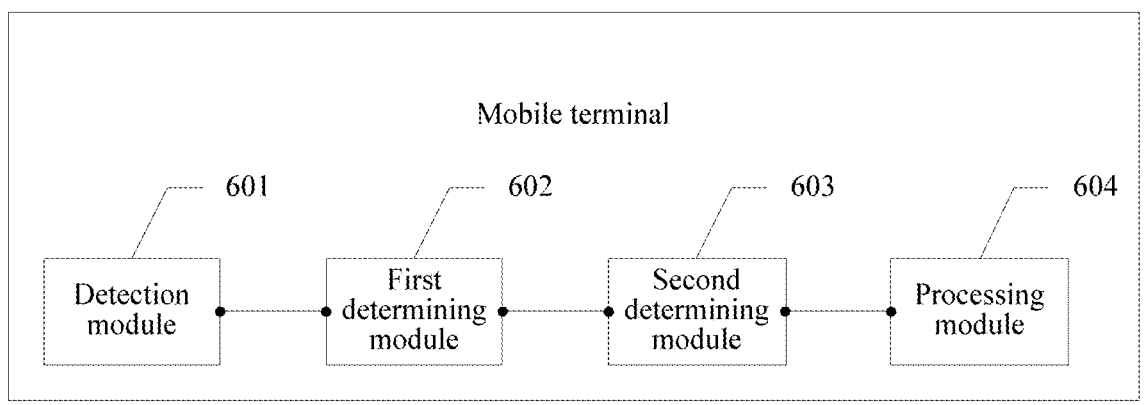
FIG. 18 is another schematic embodiment diagram of a mobile terminal according to an embodiment of the present disclosure.

The method for processing a virtual object in an application in the embodiments of the present disclosure is described above. The following describes the mobile terminal in the embodiments of the present disclosure. FIG. 18 is a schematic embodiment diagram of a mobile terminal. The mobile terminal includes an interactive application in which a plurality of virtual objects is displayed on a same screen, and a main virtual object is displayed on a display interface of the interactive application. The mobile terminal may include:

a detection module 601, configured to detect a detection range using the main virtual object as a center, the detection range including a plurality of control ranges, and each control range being corresponding to an operation performed in the control range;

a first determining module 602, configured to determine, when a target virtual object is detected in the detection range, a distance between the target virtual object and the main virtual object;

a second determining module 603, configured to determine, according to the distance, a control range to which the target virtual object belongs; and a processing module 604, configured to process the target virtual object according to an execution operation corresponding to the control range to which the target virtual object belongs.

Optionally, in some embodiments of the present disclosure, distances between the plurality of control ranges and the center are arranged in descending order, including: a server delivery range, a resource loading range, an instantiation range, and a visual range.

The processing module 604 is specifically configured to perform at least one of the following:

creating a logic object for the target virtual object and displaying a name tag corresponding to the target virtual object for which the logic object has been created, when the control range to which the target virtual object belongs is the server delivery range; or loading a corresponding resource for the target virtual object when the control range to which the target virtual object belongs is the resource loading range; or creating a target instance corresponding to the target virtual object by using a corresponding resource, when the control range to which the target virtual object belongs is the instantiation range; or performing rendering calculation on a target instance and displaying a rendered target virtual object, when the control range to which the target virtual object belongs is the visual range.

Optionally, in some embodiments of the present disclosure, the mobile terminal includes a resource cache, and the processing module 604 is specifically configured to extract, if the resource cache includes a first resource for creating an instance for the target virtual object, the first resource from the resource cache; or the processing module 604 is specifically configured to: if the resource cache does not include a first resource for creating an instance for the target virtual object, asynchronously load the first resource.

Optionally, in some embodiments of the present disclosure, the mobile terminal includes an instance cache, and the mobile terminal further includes:

the processing module 604, specifically configured to: if the instance cache includes a first instance corresponding to the target virtual object, reuse the first instance; and perform rendering calculation on the first instance, and display a rendered target virtual object.

Optionally, in some embodiments of the present disclosure, the mobile terminal includes an instance cache, and the processing module 604 is specifically configured to obtain, if the instance cache does not include a first instance corresponding to the target virtual object, a first resource for creating an instance for the target virtual object; and use the first resource to create the first instance.

Figure 19:
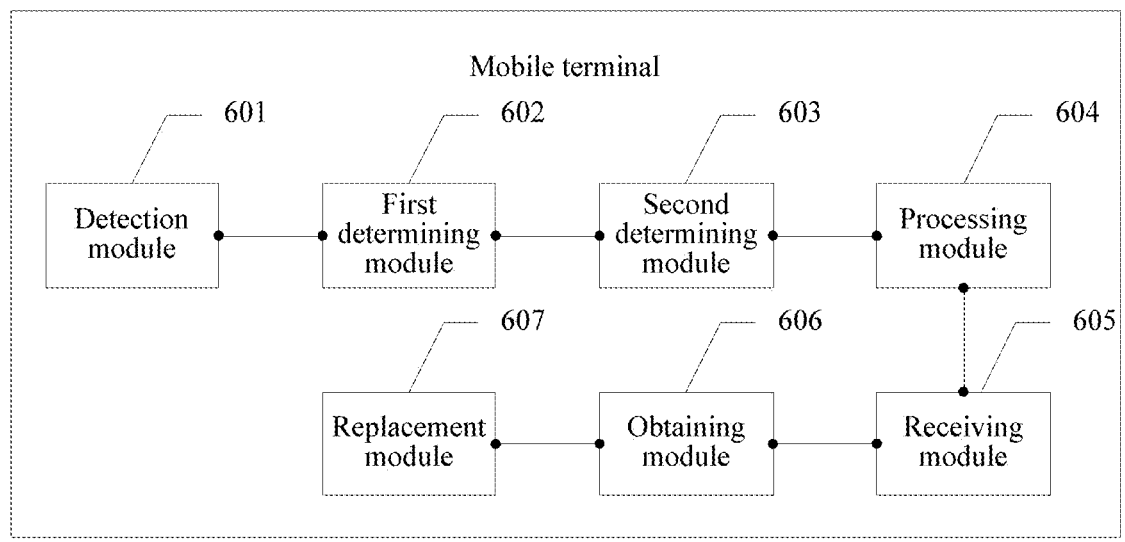
FIG. 19 is another schematic embodiment diagram of a mobile terminal according to an embodiment of the present disclosure.

Optionally, in some embodiments of the present disclosure, based on the FIG. 18, FIG. 19 is another schematic embodiment diagram of a mobile terminal. The mobile terminal may further include:

a receiving module 605, configured to receive a skin replacement instruction for the target virtual object;

an obtaining module 606, configured to obtain skeleton data corresponding to the target virtual object, and target mesh data and target material data for replacement; and a replacement module 607, configured to correspondingly replace source mesh data and source material data that are bound to the skeleton data with the target mesh data and target material data.

Figure 20:
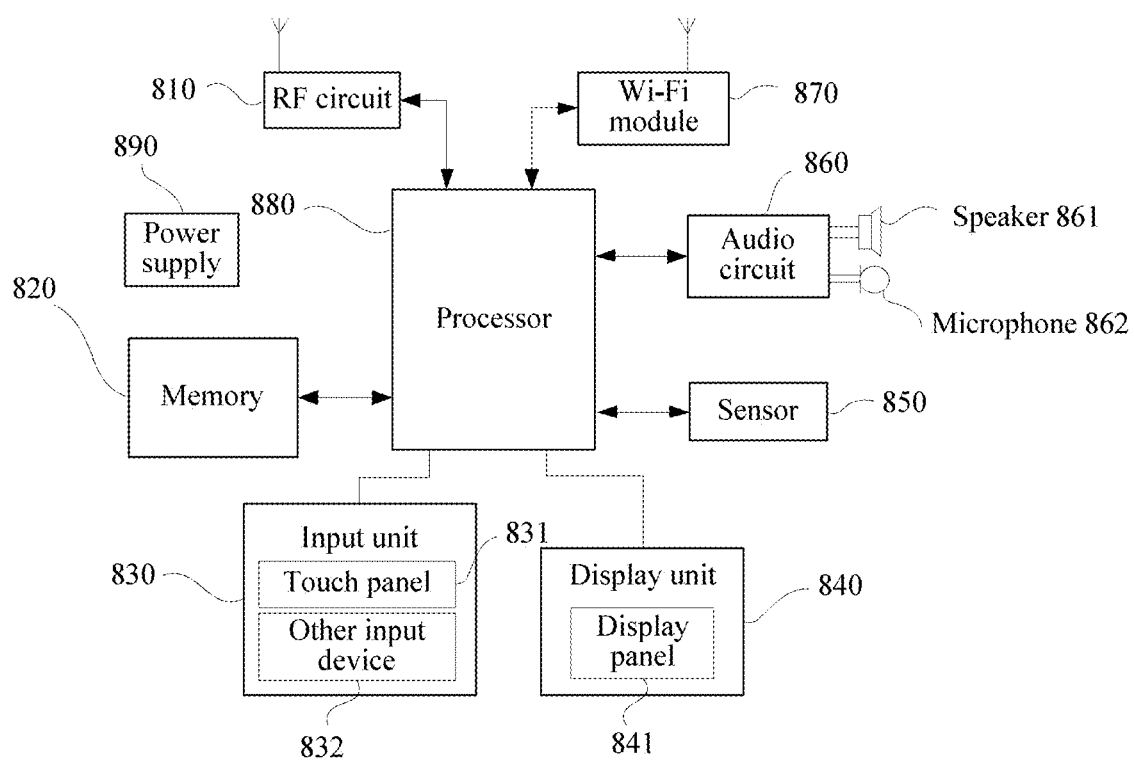
FIG. 20 is another schematic embodiment diagram of a mobile terminal according to an embodiment of the present disclosure.

FIG. 20 is another schematic embodiment diagram of a mobile terminal according to an embodiment of the present disclosure. For ease of description, only parts related to this embodiment of the present disclosure are shown. For specific technical details that are not disclosed, refer to the method parts of the embodiments of the present disclosure.

FIG. 20 is a block diagram of a structure of a part of a mobile phone related to a terminal according to an embodiment of the present disclosure. Referring to FIG. 20, the mobile phone includes components such as a radio frequency (RF) circuit 810, a memory 820, an input unit 830, a display unit 840, a sensor 850, an audio circuit 860, a wireless fidelity (Wi-Fi) module 870, a processor 880, and a power supply 890. A person skilled in the art may understand that the structure of the mobile phone shown in FIG. 20 does not constitute a limitation to the mobile phone, and the mobile phone may include more components or fewer components than those shown in the figure, or some components may be combined, or a different component deployment may be used.

The following specifically describes the components of the mobile phone with reference to FIG. 20.

The RF circuit 810 may be configured to receive and send a signal during an information receiving and sending process or a call process. Specifically, the RF circuit receives downlink information from a base station, then delivers the downlink information to the processor 880 for processing, and sends related uplink data to the base station. Generally, the RF circuit 810 includes, but is not limited to, an antenna, at least one amplifier, a transceiver, a coupler, a low noise amplifier (LNA), and a duplexer. In addition, the RF circuit 810 may also communicate with a network and another device by wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 820 may be configured to store a software program and module. The processor 880 runs the software program and module stored in the memory 820, to implement various functional applications and data processing of the mobile phone. The memory 820 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 820 may include a high speed random access memory, and may also include a non-volatile memory, such as at least one magnetic disk storage device, a flash memory, or another volatile solid-state storage device.

The input unit 830 may be configured to receive input digit or character information, and generate a keyboard signal input related to the user setting and function control of the mobile phone. Specifically, the input unit 830 may include a touch panel 831 and another input device 832. The touch panel 831, which may also be referred to as a touch screen, may collect a touch operation of a user on or near the touch panel (such as an operation of a user on or near the touch panel 831 by using any suitable object or accessory such as a finger or a stylus), and drive a corresponding connection apparatus according to a preset program. Optionally, the touch panel 831 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 880. Moreover, the touch controller can receive and execute a command sent from the processor 880. In addition, the touch panel 831 may be a resistive, capacitive, infrared, or surface sound wave type touch panel. In addition to the touch panel 831, the input unit 830 may further include the other input device 832. Specifically, the another input device 832 may include, but is not limited to, one or more of a physical keyboard, a functional key (such as a volume control key or a switch key), a track ball, a mouse, and a joystick.

The display unit 840 may be configured to display information input by the user or information provided for the user, and various menus of the mobile phone. The display unit 840 may include a display panel 841. Optionally, the display panel 841 may be configured by using a liquid crystal display (LCD), an organic light-emitting diode (OLED), or the like. Further, the touch panel 831 may cover the display panel 841. After detecting a touch operation on or near the touch panel 831, the touch panel 531 transfers the touch operation to the processor 880, so as to determine a type of a touch event. Then, the processor 880 provides corresponding visual output on the display panel 841 according to the type of the touch event. Although, in FIG. 20, the touch panel 831 and the display panel 841 are used as two separate parts to implement input and output functions of the mobile phone, in some embodiments, the touch panel 831 and the display panel 841 may be integrated to implement the input and output functions of the mobile phone.

The mobile phone may further include at least one sensor 850 such as an optical sensor, a motion sensor, and other sensors. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 860, a speaker 861, and a microphone 862 may provide audio interfaces between the user and the mobile phone. The audio circuit 860 may convert received audio data into an electric signal and transmit the electric signal to the speaker 861. The speaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another mobile phone by using the RF circuit 810, or outputs the audio data to the memory 820 for further processing.

Wi-Fi is a short distance wireless transmission technology. The mobile phone may help, by using the Wi-Fi module 870, the user to receive and send e-mails, browse a web page, access streaming media, and so on, which provides wireless broadband Internet access for the user. Although FIG. 20 shows the Wi-Fi module 870, it may be understood that the Wi-Fi module 870 is not a necessary component of the mobile phone, and when required, the Wi-Fi module 870 may be omitted as long as the scope of the essence of the present disclosure is not changed.

The processor 880 is the control center of the mobile phone, and is connected to various parts of the mobile phone by using various interfaces and lines. By running or executing the software program and/or module stored in the memory 820, and invoking data stored in the memory 820, the processor 880 performs various functions and data processing of the mobile phone, thereby performing overall monitoring on the mobile phone. Optionally, the processor 880 may include one or more processing units. Preferably, the processor 880 may integrate an application processor and a modem. The application processor mainly processes an operating system, a user interface, an application program, and the like. The modem mainly processes wireless communication. It may be understood that the foregoing modem may also not be integrated into the processor 880.

The mobile phone further includes the power supply 890 (such as a battery) for supplying power to the components. Preferably, the power supply may be logically connected to the processor 880 by using a power management system, thereby implementing functions such as charging, discharging, and power consumption management by using the power management system.

Although not shown in the figure, the mobile phone may further include a camera, a Bluetooth module, and the like, which are not further described herein.

In this embodiment of the present disclosure, the processor 880 included in the terminal further has the following functions:

detecting a detection range using the main virtual object as a center, the detection range including a plurality of control ranges, and each control range being corresponding to an operation performed in the control range; determining, when a target virtual object is detected in the detection range, a distance between the target virtual object and the main virtual object; determining, according to the distance, a control range to which the target virtual object belongs; and processing the target virtual object according to an execution operation corresponding to the control range to which the target virtual object belongs.

Optionally, in some embodiments of the present disclosure, distances between the plurality of control ranges and the center are arranged in descending order, including: a server delivery range, a resource loading range, an instantiation range, and a visual range. The processor 880 further has the following functions:

creating a logic object for the target virtual object and displaying a name tag corresponding to the target virtual object for which the logic object has been created, when the control range to which the target virtual object belongs is the server delivery range; or loading a corresponding resource for the target virtual object when the control range to which the target virtual object belongs is the resource loading range; or creating a target instance corresponding to the target virtual object by using a corresponding resource, when the control range to which the target virtual object belongs is the instantiation range; or performing rendering calculation on a target instance and displaying a rendered target virtual object, when the control range to which the target virtual object belongs is the visual range.

Optionally, in some embodiments of the present disclosure, the mobile terminal includes a resource cache, and the processor 880 further has the following functions:

extracting, if the resource cache includes a first resource for creating an instance for the target virtual object, the first resource from the resource cache; or if the resource cache does not include a first resource for creating an instance for the target virtual object, asynchronously loading the first resource.

Optionally, in some embodiments of the present disclosure, the mobile terminal includes an instance cache, and the processor 880 further has the following functions:

if the instance cache includes a first instance corresponding to the target virtual object, reuse the first instance; and perform rendering calculation on the first instance, and display a rendered target virtual object.

Optionally, in some embodiments of the present disclosure, the mobile terminal includes an instance cache, and the processor 880 further has the following functions:

obtaining, if the instance cache does not include a first instance corresponding to the target virtual object, a first resource for creating an instance for the target virtual object; and using the first resource to create the first instance.

Optionally, in some embodiments of the present disclosure, the processor 880 further has the following functions:

receiving a skin replacement instruction for the target virtual object; obtaining skeleton data corresponding to the target virtual object, and target mesh data and target material data for replacement; and correspondingly replacing source mesh data and source material data that are bound to the skeleton data with the target mesh data and target material data.

It may be clearly understood by persons skilled in the art that for convenience and brevity of description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. The described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units according to the embodiments of the present disclosure may be integrated in one processing unit or exist as separate physical units, or two or more units are integrated in one unit. The integrated unit may be implemented in a form of hardware, or may be implemented in a form of a software functional unit.

If implemented in the form of software functional units and sold or used as an independent product, the integrated units may also be stored in a computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the principle and scope of the technical solutions of the embodiments of the present disclosure.

What is claimed is:

1. An information processing method performed at a mobile terminal having one or more processors and memory storing a plurality of instructions to be executed by the one or more processors, the method being applied to a first client, in which a plurality of virtual objects is displayed on a screen of the mobile terminal, a first virtual object being displayed on a display interface of the first client, and the method comprising:

receiving a skill casting request of the first virtual object sent by the first client, the skill casting request being used for requesting to cast a first skill;

determining a quantity of virtual objects within a field of view of the first virtual object in a virtual scene;

randomly selecting a plurality of target virtual objects from the virtual objects within the field of view if the quantity of virtual objects within the field of view is greater than a predetermined threshold;

obtaining a first broadcast notification generated in response to the skill casting request, and sending the first broadcast notification to a second client corresponding to a target virtual object among the plurality of target virtual objects, the first broadcast notification being used for instructing the second client to present an action of casting the first skill by the first virtual object;

identifying, among the plurality of target virtual objects, a first plurality of target virtual objects that have been killed by the first skill and a second plurality of target virtual objects that have been injured by the first skill;

sending a first effect broadcast notification to each client corresponding to a respective one of the quantity of virtual objects within the field of view, the first effect broadcast notification indicating that the first plurality of target virtual objects have been killed by the first skill; and sending a second effect broadcast notification to only each affected client corresponding to a respective one of the second plurality of target virtual objects, the second effect broadcast notification indicating that the target virtual object corresponding to the affected client has been injured by the first skill.

2. The information processing method according to claim 1, further comprising:
sending a second broadcast notification generated in response to the skill casting request to clients corresponding to all the virtual objects within the field of view of the first virtual object if the quantity of virtual objects within the field of view is less than or equal to the predetermined threshold.

3. The information processing method according to claim 2, further comprising:
determining whether the first skill s used for adjusting a location of the first virtual object in the virtual scene; and
triggering, if the first skill is not used for adjusting the location of the first virtual object in the virtual scene, the step of determining the quantity of virtual objects within the field of view of the first virtual object in the virtual scene.

4. The information processing method according to claim 3, further comprising:
determining, if the first skill is used for adjusting the location of the first virtual object in the virtual scene, an adjusted new location of the first virtual object in the virtual scene, and sending a third broadcast notification to the clients corresponding to all the virtual objects within the field of view, the third broadcast notification being used for instructing to update the location of the first virtual object in the virtual scene to the new location.

5. The information processing method according to claim 1, wherein the determining a quantity of virtual objects within a field of view of the first virtual object in a virtual scene comprises:

determining a coordinate range corresponding to the field of view of the first virtual object by using coordinates of the first virtual object as a center; and
matching current coordinates of each virtual object in the virtual scene with the coordinate range, to determine the quantity of virtual objects whose coordinates fall within the coordinate range.

6. The information processing method according to claim 1, wherein the selecting the plurality of target virtual objects from the virtual objects within the field of view comprises:
selecting the plurality of target virtual objects whose quantity is equal to the predetermined threshold from the field of view; or
determining various types of groups to which all the virtual objects Within the field of view belong, and selecting the plurality of target virtual objects whose quantity is equal to the predetermined threshold from the field of view, a corresponding quantity of target virtual objects in each type of group meets a set requirement; or
selecting, according to relationship degrees between the virtual objects within the field of view and the first virtual object, the plurality of target virtual objects whose quantity is equal to the predetermined threshold.

7. The information processing method according to claim 1, further comprising:
determining, according to the skill casting request, at least one second virtual object at which the first skill is targeted;
determining a remaining attribute value of each second virtual object influenced by the first skill;
correspondingly generating, according to the remaining attribute value of each second virtual object influenced by the first skill, another broadcast notification for instructing to present an effect of influence of the first skill on the second virtual object;
for the each second virtual object whose remaining attribute value meets a preset condition, sending the another broadcast notification corresponding to the second virtual object to clients corresponding to all virtual objects within a field of view of the second virtual object; and
for the each second virtual object whose remaining attribute value does not meet the preset condition, separately sending the another broadcast notification corresponding to the second virtual object to the first client and a client corresponding to the each second virtual object.

8. The information processing method according to claim 7, wherein the determining, according to the skill casting request, at least one second virtual object at which the first skill is targeted comprises:
determining, according to a virtual object list carried in the skill casting request, the at least one second virtual object at which the first skill is targeted, the virtual object list recording the at least one second virtual object at which the first skill cast by the first virtual object is targeted.

9. The information processing method according to claim 7, wherein the remaining attribute value comprises remaining hit points, and that the remaining attribute value meets the preset condition comprises: the remaining hit points are zero.

10. The information processing method according to claim 9, wherein the first skill is an attack skill, the another broadcast notification comprises lost hit points and remaining hit points of the second virtual object attacked by the first skill, and the another broadcast notification triggers a death event of the second virtual object if the remaining hit points are zero.

11. A mobile terminal comprising: one or more processors, memory, and a plurality of machine readable instructions stored in the memory, wherein the plurality of machine readable instructions, when executed by the one or more processors, cause the mobile terminal to perform a plurality of operations as being applied to a first client, in which a plurality of virtual objects is displayed on a screen of the mobile terminal, a first virtual object being displayed on a display interface of the first client, the plurality of operations including:
- receiving a skill casting request of the first virtual object sent by the first client, the skill casting request being used for requesting to cast a first skill;
- determining a quantity of virtual objects within a field of view of the first virtual object in a virtual scene;
- randomly selecting a plurality of target virtual objects from the virtual objects within the field of view if the quantity of virtual objects within the field of view is greater than a predetermined threshold;
- obtaining a first broadcast notification generated in response to the skill casting request, and sending the first broadcast notification to a second client corresponding to a target virtual object among the plurality of target virtual objects, the first broadcast notification being used for instructing the second client to present an action of casting the first skill by the first virtual object;
- identifying, among the plurality of target virtual objects, a first plurality of target virtual objects that have been killed by the first skill and a second plurality of target virtual objects that have been injured by the first skill;
- sending a first effect broadcast notification to each client corresponding to a respective one of the quantity of virtual objects within the field of view, the first effect broadcast notification indicating that the first plurality of target virtual objects have been killed by the first skill; and
- sending a second effect broadcast notification to only each affected client corresponding to a respective one of the second plurality of target virtual objects, the second effect broadcast notification indicating that a target virtual object corresponding to the affected client has been injured by the first skill.

12. The mobile terminal according to claim 11, wherein the plurality of operations comprise:
- sending a second broadcast notification generated in response to the skill casting request to clients corresponding to all the virtual objects within the field of view of the first virtual object if the quantity of virtual objects within the field of view is less than or equal to the predetermined threshold.

13. The mobile terminal according to claim 11, wherein the determining a quantity of virtual objects within a field of view of the first virtual object in a virtual scene comprises:
- determining a coordinate range corresponding to the field of view of the first virtual object by using coordinates of the first virtual object as a center; and
- matching current coordinates of each virtual object in the virtual scene with the coordinate range, to determine the quantity of virtual objects whose coordinates fall within the coordinate range.

14. The mobile terminal according to claim 11, wherein the selecting the plurality of target virtual objects from the virtual objects within the field of view comprises:
- selecting the plurality of target virtual objects whose quantity is equal to the predetermined threshold from the field of view; or
- determining various types of groups to which all the virtual objects within the field of view belong, and selecting the plurality of target virtual objects whose quantity is equal to the predetermined threshold from the field of view, a corresponding quantity of target virtual objects in each type of group meets a set requirement; or
- selecting, according to relationship degrees between the virtual objects within the field of view and the first virtual object, the plurality of target virtual objects whose quantity is equal to the predetermined threshold.

15. The mobile terminal according to claim 11, wherein the plurality of operations comprise:
- determining, according to the skill casting request, at least one second virtual object at which the first skill is targeted;
- determining a remaining attribute value of each second virtual object influenced by the first skill;
- correspondingly generating, according to the remaining attribute value of each second virtual object influenced by the first skill, another broadcast notification for instructing to present an effect of influence of the first skill on the second virtual object;
- for the each second virtual object whose remaining attribute value meets a preset condition, sending the another broadcast notification corresponding to the second virtual object to clients corresponding to all virtual objects within a field of view of the second virtual object; and
- for the each second virtual object whose remaining attribute value does not meet the preset condition, separately sending the another broadcast notification corresponding to the second virtual object to the first client and a client corresponding to the each second virtual object.

16. A non-transitory computer readable storage medium storing a plurality of machine readable instructions in connection with a mobile terminal having one or more processors, wherein the plurality of machine readable instructions, when executed by the one or more processors, cause the mobile terminal to perform a plurality of operations as being applied to a first client, in which a plurality of virtual objects is displayed on a screen of the mobile terminal, a first virtual object being displayed on a display interface of the first client, the plurality of operations including:
- receiving a skill casting request of the first virtual object sent by the first client, the skill casting request being used for requesting to cast a first skill;
- determining a quantity of virtual objects within a field of view of the first virtual object in a virtual scene;
- randomly selecting a plurality of target virtual objects from the virtual objects within the field of view if the quantity of virtual objects within the field of view is greater than a predetermined threshold;
- obtaining a first broadcast notification generated in response to the skill casting request, and sending the first broadcast notification to a second client corresponding to a target virtual object among the plurality of target virtual objects, the first broadcast notification being used for instructing the second client to present an action of casting the first skill by the first virtual object;
- identifying, among the plurality of target virtual objects, a first plurality of target virtual objects that have been killed by the first skill and a second plurality of target virtual objects that have been injured by the first skill;

sending a first effect broadcast notification to each client corresponding to a respective one of the quantity of virtual objects within the field of view, the first effect broadcast notification indicating that the first plurality of target virtual objects have been killed by the first skill; and sending a second effect broadcast notification to only each affected client corresponding to a respective one of the second plurality of target virtual objects, the second effect broadcast notification indicating that a target virtual object corresponding to the affected client has been injured by the first skill.

17. The non-transitory computer readable storage medium according to claim 16, wherein the plurality of operations comprise:

sending a second broadcast notification generated in response to the skill casting request to clients corresponding to all the virtual objects within the field of view of the first virtual object if the quantity of virtual objects within the field of view is less than or equal to the predetermined threshold.

18. The non-transitory computer readable storage medium according to claim 16, wherein the determining a quantity of virtual objects within a field of view of the first virtual object in a virtual scene comprises:

determining a coordinate range corresponding to the field of view of the first virtual object by using coordinates of the first virtual object as a center; and matching current coordinates of each virtual object in the virtual scene with the coordinate range, to determine the quantity of virtual objects whose coordinates fall within the coordinate range.

19. The non-transitory computer readable storage medium according to claim 16, wherein the selecting the plurality of target virtual objects from the virtual objects within the field of view comprises:

selecting the plurality of target virtual objects whose quantity is equal to the predetermined threshold from the field of view; or determining various types of groups to which all the virtual objects within the field of view belong, and selecting the plurality of target virtual objects whose quantity is equal to the predetermined threshold from the field of view, a corresponding quantity of target virtual objects in each type of group meets a set requirement; or selecting, according to relationship degrees between the virtual objects within the field of view and the first virtual object, the plurality of target virtual objects whose quantity is equal to the predetermined threshold.

20. The non-transitory computer readable storage medium according to claim 16, wherein the plurality of operations comprise:

determining, according to the skill casting request, at least one second virtual object at which the first skill is targeted;

determining a remaining attribute value of each second virtual object influenced by the first skill;

correspondingly generating, according to the remaining attribute value of each second virtual object influenced by the first skill, another broadcast notification for instructing to present an effect of influence of the first skill on the second virtual object;

for the each second virtual object whose remaining attribute value meets a preset condition, sending the another broadcast notification corresponding to the second virtual object to clients corresponding to all virtual objects within a field of view of the second virtual object; and for the each second virtual object whose remaining attribute value does not meet the preset condition, separately sending the another broadcast notification corresponding to the second virtual object to the first client and a client corresponding to the each second virtual object.

\* \* \* \* \*